US011075693B1

(12) United States Patent
Regunathan et al.

(10) Patent No.: US 11,075,693 B1
(45) Date of Patent: Jul. 27, 2021

(54) SYSTEM AND METHOD FOR GENERIC GATEWAY MODEM SATELLITE BEAM HOPPING

(71) Applicant: Hughes Network Systems, LLC, Germantown, MD (US)

(72) Inventors: Murali Regunathan, Germantown, MD (US); Yogesh Sethi, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/945,347

(22) Filed: Jul. 31, 2020

(51) Int. Cl.
*H04L 27/28* (2006.01)
*H04B 7/204* (2006.01)
*H04L 5/00* (2006.01)
*H04B 7/08* (2006.01)
*H04B 7/06* (2006.01)

(52) U.S. Cl.
CPC ......... *H04B 7/2041* (2013.01); *H04B 7/0695* (2013.01); *H04B 7/0891* (2013.01); *H04L 5/0023* (2013.01)

(58) Field of Classification Search
CPC .. H04B 7/2041; H04B 7/0695; H04B 7/0891; H04L 5/0023
USPC ......................................... 375/260; 455/12.1
See application file for complete search history.

(56) References Cited

U.S. PATENT DOCUMENTS

| | | | |
|---|---|---|---|
| 9,954,601 B2* | 4/2018 | Buer | H04B 7/204 |
| 10,361,772 B2 | 7/2019 | Regunathan et al. | |
| 10,694,479 B2 | 6/2020 | Regunathan et al. | |
| 2013/0070666 A1* | 3/2013 | Miller | H04B 7/18543 370/326 |
| 2017/0070308 A1* | 3/2017 | Hahn, III | H03F 3/24 |
| 2020/0274611 A1* | 8/2020 | Mendelsohn | H01Q 1/288 |
| 2020/0280334 A1* | 9/2020 | McLain | H01Q 15/14 |

OTHER PUBLICATIONS

U.S. Appl. No. 16/572,757, filed Sep. 17, 2019.

* cited by examiner

*Primary Examiner* — Don N Vo
(74) *Attorney, Agent, or Firm* — NovoTechIP International PLLC

(57) ABSTRACT

Systems and methods are disclosed, and one includes receiving an encoded data stream, generating a first upsampled encoded block, based on a first upsampling rate upsampling of a first content from the data stream, communicating the first upsampled encoded block to a beam hopping satellite, on an uplink, during an uplink first time interval having a synchronization with a first beam of the beam hopping satellite, as a feed for the first beam. The systems may further include generating, starting at a time within the uplink first time interval, a second upsampled encoded block, based on a second upsampling rate upsampling of a second content from the data stream, and communicating the second upsampled encoded block via the uplink to the beam hopping satellite, during an uplink second time interval having a synchronization with a second beam of the beam hopping satellite, as a feed for the second beam.

20 Claims, 17 Drawing Sheets

US 11,075,693 B1

SYSTEM AND METHOD FOR GENERIC GATEWAY MODEM SATELLITE BEAM HOPPING

BACKGROUND

In a beam-hopping satellite system, a satellite may hop one or more of its transmission beams, or reception beams, or both, among a particular pattern of cells, and can dwell on and serve each for a duration of time. The duration of the dwell the specific outroutes and inroutes carried, and various transmission performance and quality parameters can differ from cell to cell. Different cells can have various different features that affect adaptivity of service. For example, different cells may have different bandwidths for different geographical regions at different times. Adapting the service to use multiple cells can thus result in technical issues that can impact or limit performance metrics and/or increase costs.

SUMMARY

This Summary identifies example features and aspects and is not an exclusive or exhaustive description of the disclosed subject matter. Whether features or aspects are included in, or omitted from this Summary is not intended as indicative of relative importance of such features. Additional features and aspects are described, and others will become apparent to persons skilled in the art upon reading the following detailed description and viewing the drawings that form a part thereof.

An example of disclosed systems for satellite gateway feed for beam hopping, can be configured to receive an encoded data stream, generate a first upsampled encoded block, based at least in part on a first upsampling rate upsampling of a first content from the encoded data stream, communicate the first upsampled encoded block to a beam hopping satellite, on an uplink, during an uplink first time interval having a synchronization with a first beam of the beam hopping satellite, as a feed for the first beam, generate, starting at a time within the uplink first time interval, a second upsampled encoded block, based at least in part on a second upsampling rate upsampling of a second content from the encoded data stream, and communicate the second upsampled encoded block via the uplink to the beam hopping satellite, during an uplink second time interval having a synchronization with a second beam of the beam hopping satellite, as a feed for the second beam.

An example of disclosed methods can include receiving an encoded data stream, generating a first upsampled encoded block, based at least in part on a first upsampling rate upsampling of a first content from the encoded data stream, communicating the first upsampled encoded block via an uplink to a beam hopping satellite, during an uplink first time interval having a synchronization with a first beam of the beam hopping satellite, as a feed for the first beam, generating, starting at a time within the uplink first time interval, a second upsampled encoded block based at least in part on a second upsampling rate upsampling of a second content from the encoded data stream, and communicating the second upsampled encoded block via the uplink to the beam hopping satellite, during an uplink second time interval having a synchronization with a second beam of the beam hopping satellite, as a feed for the second beam.

BRIEF DESCRIPTION OF THE DRAWINGS

The drawings and figures depict various implementations in accordance with the present teachings, by way of example only, not by way of limitation. In the figures, like reference numerals refer to the same or similar elements. For purposes of convenience the drawings are not necessarily made to scale.

DETAILED DESCRIPTION

Figure 1:
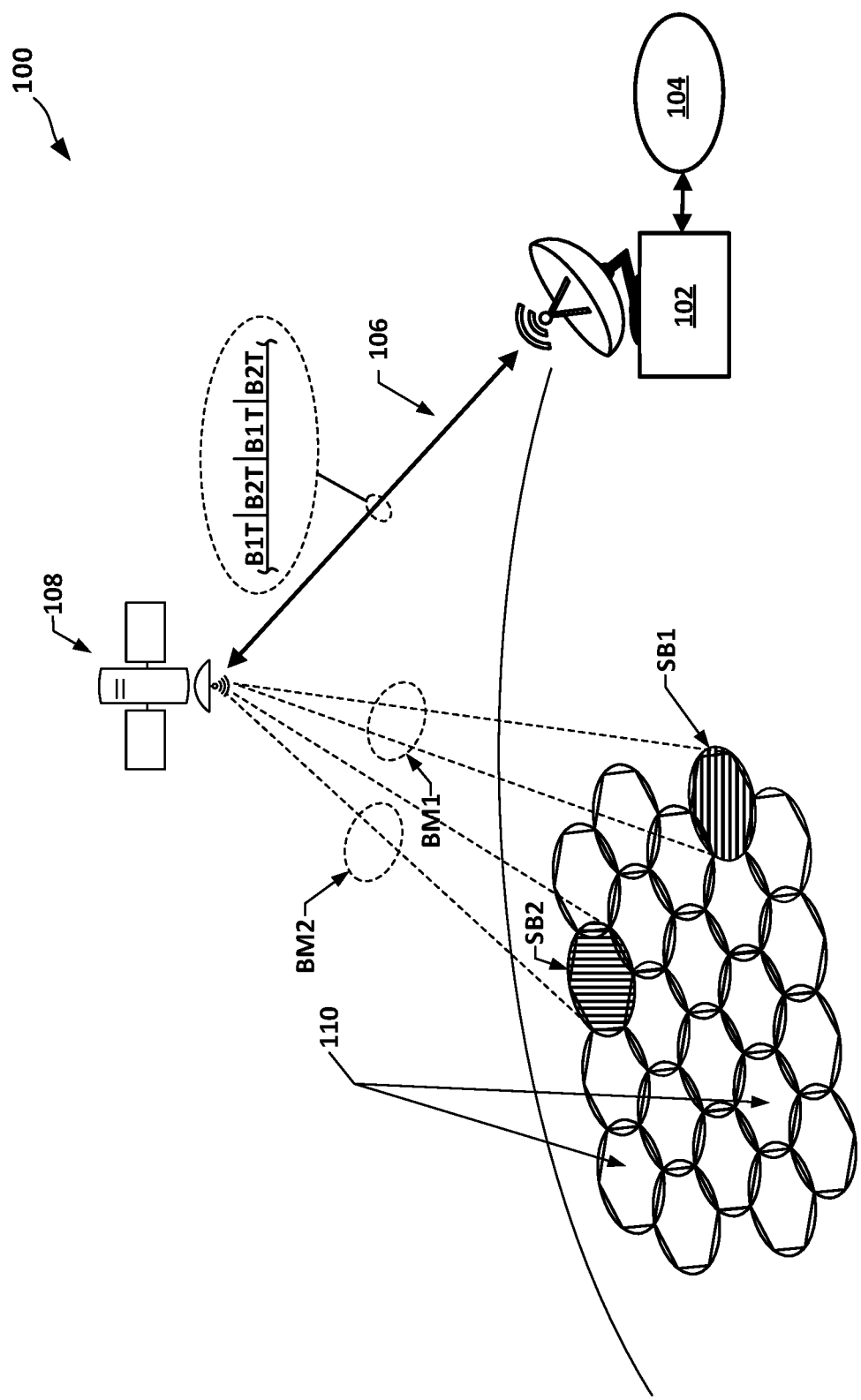
FIG. 1 is a high-level functional block diagram of an example beam hopping satellite system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, to avoid unnecessarily obscuring aspects of the present teachings.

A generic gateway (GTW) modem in accordance with this disclosure can provide modulating and routing of different outroute carriers to different beams. The routing can dynamically synchronize with a beam hopping plan of a beam hopping satellite. The GTW modem can also include rapid reduced latency reprogramming such that payload cost can be reduced and capacity can be increased. Furthermore, the GTW modem can be configured to dynamically synchronize and reconfigure to receive and demodulate carriers from different beams. Moreover, the GTW modem can include storing, for example, frequency timing and amplitude configurations necessary to receive the carriers from each beam. A beam hopping time plan associated with a beam hopping satellite can be distinct from the transmit time plan. GTW modem can also feature programming of the terminals to provide, at every hopping instant, a specific symbol rate, and/or center frequency information that each terminal may transmit from the different beams.

In one or more implementations, the GTW modem can receive a multi-channel stream carrying, for example, integer M content channels. The GTW modem can be configured with an output which can interface through an uplink to a beam hopping satellite. The beam hopping satellite can transmit a downlink transmission beam and can hop the direction of the transmission beam through a sequence or pattern. The sequence or pattern may place a corresponding sequential pattern of spot beams where each particular spot beam may be placed on a particular cell within a pattern of R cells.

An implementation of the GTW modem can provide R groups or sets of upsamplings, one for each of the R cells in the hopping pattern. Each of the R groups or sets of upsamplings can be provided by a correspondingly configured group or set of upsamplers. Example implementations of the upsamplers in each of the R groups can, but do not necessarily include, certain dedicated hardware. In each of the R groups, each member upsampler can be configured to provide a particular upsampling of a particular one of the M content channels. In an aspect, for each of the groups or sets of upsamplers, the GTW modem can be configured to generate each of the R combinations of upsampled channel sampled streams with a configuration. For example, the configuration may determine which ones among the M channels have upsampled sample stream in the combination and the specifications. Furthermore, the configuration may provide quality parameters for each of the R combinations of upsampled channel sampled streams where the quality parameters match a specific type and quality of service to a particular one of the R cells.

Implementations of the GTW modem can provide each of the R sets or combinations of upsampled channel sample streams to the beam hopping satellite with timings. For example, through synchronization of the GTW modem to the uplink and/or of the uplink to the satellite, each of the R combinations can be fed to the transmission beam while dwelling on the particular one of the R cells for which the combination was generated.

One or more implementations can include an upsampler structure and configuration that, while upsampling is still being performed by one of the R sets of upsamplers, or while upsampling output from said one set of the R sets of upsamplers is still being delivered to a beam, can provide a commencement of operation, e.g., initialization operations of at least one of the remaining R−1 sets upsamplers.

In an aspect, such commencement of operation, e.g., initialization operations, can be performed by one of the R−1 other sets of upsamplers that corresponds to the next cell in the beam's hopping pattern. For purposes of description, the one of the R−1 other sets of upsamplers that corresponds to the next cell in the beam's hopping pattern can be referred to as the "next hop upsampler set." In one or more implementations, commencement of operations by the next hop upsampler set can be timed such that delivery of output from the next hop upsampler can start or commence at a time that can be aligned with the hop of the beam to the next cell, i.e., the cell served by the next hop upsampler set.

As illustration of certain features, one arbitrary example implementation and configuration of a GTW modem in accordance with this disclosure will be described. Also described will be certain examples of operations such a configuration can perform. It will be understood that neither this example configuration, nor the described example operations and combinations of operations are intended as a limitation on the scope of practices in accordance with this disclosure, and as any statement of preferences regarding, for example configuration, or environments or applications for such practices.

The example GTW modem will be assumed as configured to receive a multi-channel stream carrying integer 3 content channels. The three channels will be referred to as a "first content channel," "second content channel" and "third content channel." The example GTW modem will be arbitrarily assumed as feeding a two-beam beam hopping satellite. The two-beam pattern will be assumed as a hopping between a first beam that, when active, places a first spot beam on a first cell and a second beam that, when active, places a second spot beam on a second cell. The example GTW modem will be assumed as configured such that the first beam serves the first cell with all three of the content channels, and the second beam serves the second cell with only the first and second content channels. For purposes of illustration, it will be assumed that the specified performance and quality(ies) of the first content channel delivery to the first cell is the same as that specified for the first content channel delivery to the second cell. Also for purposes of illustration, it will be assumed that the specified type and quality(ies) of the second content channel delivery to the second cell includes a bandwidth wider than that of the second content channel delivery to the first cell.

An example configuration of a GTW modem meeting the above-described requirements can include two sets of upsamplers—a first set for the first cell and a second set for the second cell. The transmission beam can therefore be referred to as a "first beam" when dwelling on the first cell and as a "second beam" when dwelling on the second cell. Accordingly, the first set of upsamplers and the second set of upsamplers will be alternatively referred to as a "first beam upsampler set" and "second beam upsampler set," respectively.

In one or more implementations, the number of upsamplers in each of the two example upsampler sets can be determined by the number of content channels the beam will deliver to its corresponding cell. In this example configuration, the first beam serves the first cell with all three of the example content channels, and the second beam serves the second cell with only the first and second content channels. Accordingly, an implementation of the first beam upsampler set can include three upsamplers, one for each of the three content channels the first beam will carry. Likewise, the second beam upsampler set can be implemented by two upsamplers, one for each of its two content channels.

Regarding configurations of the upsamplers in the first beam upsampler set and the upsamplers in the second beam upsampler set, the first content channel upsampler of the first beam upsampler set can be configured the same as the first content channel upsampler of the second beam upsampler set because, as stated above, this example assumes the first content channel is delivered with the same specifications and quality parameters by the first beam as it is by the second beam. The second content channel in this example, though, is assumed delivered to the second cell with a larger bandwidth than delivered to the first cell. Accordingly, the second beam second channel upsampler can be configured with different upsampling parameters than the first beam second channel upsampler. Also, for this example, the third content channel is assumed not delivered by the second beam. Therefore, the second beam upsampler set of this example need not include a third content channel upsampler.

Figure 14:
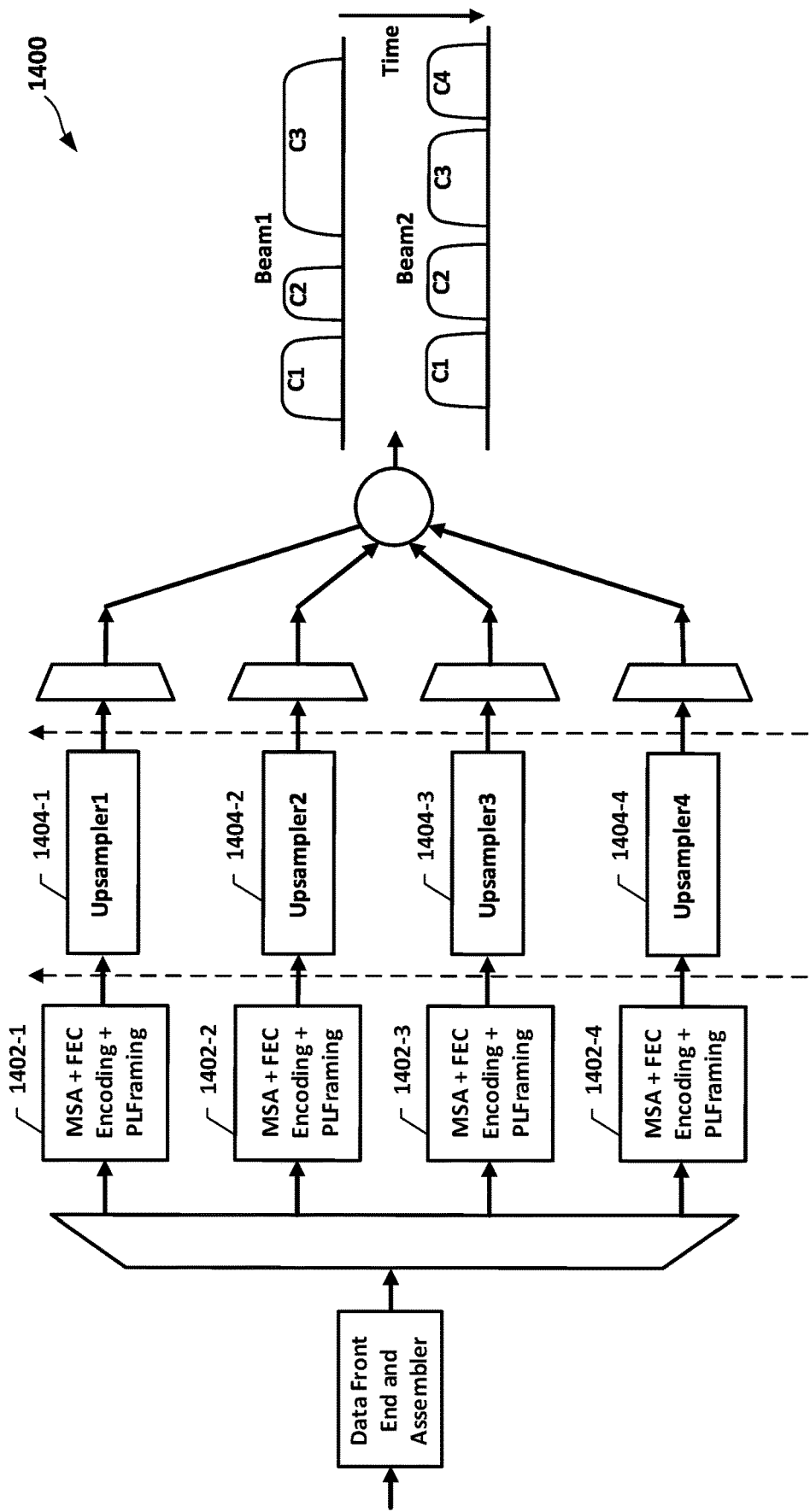
FIG. 14 is a functional block schematic of one implementation of the graphical illustration of one example dual beam hopping transmitter set, using partial-reprogramming architecture.

A generic transmitter that can serve any beam hopping system may require that the number of carriers and parameters of each of the carriers pertaining to a beam in a beam hopping cycle be different. The parameters of each carrier can include a center frequency, a symbol rate, roll off, power, and the like. In such beam hopping systems, the data routed to each of the carriers may also be different as different terminals may be served by each carrier which benefits the serving of multiple beams. As described below, a ping-pong configuration/architecture allows for beam hopping while fast configuration (e.g., partial reprogramming architecture as shown in FIG. 14) allows for reuse of the ping-pong architecture in more than two beams, where one beam is being used and the other beam is being fast reconfigured (e.g., with rapid and reduced latency). This may enable reuse of a channel group to serve multiple beams through a combination of the ping-pong configuration and fast reconfiguration.

To reduce the time gap allowed for transitioning between the two hops in a beam hopping cycle, two sets of transmitters can be used in a ping-pong fashion. Each transmitter set can include multiple transmitter chains. Each chain can include one or more of encoders, formatters, symbol mappers Nyquist filters, upsamplers signal predistorters, and the like. An example ping-pong implementation of beam hopping system described below further provides an upsample capture buffer for each upsampler in the first beam upsampler set and for each upsampler in the second beam upsampler set. Each transmitter chain in a set can be reconfigured to serve a different beam while the alternate transmitter set is serving a beam. One target for a minimum reconfiguration time can be equivalent to a given minimum dwell time, for example, in the order of microseconds. In order to achieve fast reconfiguration, one implementation includes placing configurations for each of a population of different beams in hardware, as opposed to software.

Another consideration is to transmit path delay equalization. During reconfiguration, all the buffers in the transmitter chain (e.g., buffers associated with upsamplers) can be cleared out such that the data from a previous beam does not affect the data of the next beam. In addition since there may be a certain delay through the buffers, the data of the new beam can be sent through the chain earlier than the required switching point. This delay in the path may be dependent on the carrier configuration, and therefore may be taken into account.

The number of carriers in a beam can vary. Depending on the configuration, this number can vary from one to five, or even ten. In one or more implementations, the total bandwidth served to the beams in a beam hopping cycle can be constant, while the throughput being served by a transmitter chain can vary drastically. In one or more implementations, a transmitter set can have one chain serving the whole bandwidth in one beam hop period. However, in the next beam hop period, the transmitter can have five or ten transmitter chains serving the same bandwidth. For example, for provisioning of resources, each of five or ten chains that can serve the whole bandwidth can be provided. Although a small number of transmitter chains can be implemented for some applications at a low cost, having a small number of transmitter chains may be impractical from a resource usage point of view.

FIG. 1 is a high-level functional block schematic of an example beam hopping satellite system 100 ("system 100"). The system 100 can include a beam hopping satellite 108, for example, a high throughput geostationary satellite, configured to receive a multichannel uplink signal from a terrestrial satellite gateway antenna and distribute the channel data to a service area through a downlink signal. The service area can be divided into a tessellation of hexagonal cells, generically numbered 110 (collectively "hexagonal cells 110"). For purposes of this description, the cells 110 can be considered geographically fixed, i.e., not adjusted in a dynamic real-time manner.

The beam hopping satellite 108 can provide service to the tessellation of hexagonal cells 110 through a plurality spot beams, such as the representative two labeled respectively as "SB1" and "SB2" (collectively "spot beams SB"). Each spot beam SB can correspond to the central portion of a transmit/receive beam main lobe of one beam of a platform-based multibeam antenna. To avoid interference between adjacent cells 110, the platform 101 configures transmission in each beam with a frequency band and/or polarization different from what it uses within beams for adjacent cells.

Within each cell 110 can be a population of terminals (not explicitly visible in FIG. 1), for example, Very Small Aperture Terminals (VSAT), with downlink/uplink transceivers. One or more of the VSATs can serve a population of client communication devices, such as personal computers, multimedia entertainment devices, and smart phones.

As described above, spot beams SB may be transmitted by a satellite antenna of the satellite resource 108. As also described, the hexagonal cells 110 are geographically fixed. Therefore, the motion of the antenna correspondingly moves spot beams SB relative to the cells 110.

The beam hopping satellite 108 can also connect user terminals in a network 104 via a satellite gateway 102. The satellite gateway 102 can include a radio frequency (RF) transmitter/receiver (TX/RX) that can transmit an uplink 106 to the beam hopping satellite 108 and receive from the beam hopping satellite 108 via a downlink (not separately labeled in FIG. 1).

The system 100 allows the beams to be dynamically routed and synchronized with a beam hopping plan of the beam hopping satellite 108. For example, at the peak traffic hour of 5 pm Eastern time, the beam hopping satellite 108 can transmit a beam to place a spot beam in New York for three hours. At 8 pm Eastern time or 5 pm Pacific time when New York is no longer busy but California gets traffic congestions, the beam hopping satellite 108 can hop the beam to place a spot beam in California. The on-demand beam hopping optimizes the usage of beam bandwidth and therefore improves system efficiency. Also, the system 100 supports dynamic synchronization and fast reconfiguration for different beams, which further increases system efficiency and flexibility.

Figure 2:
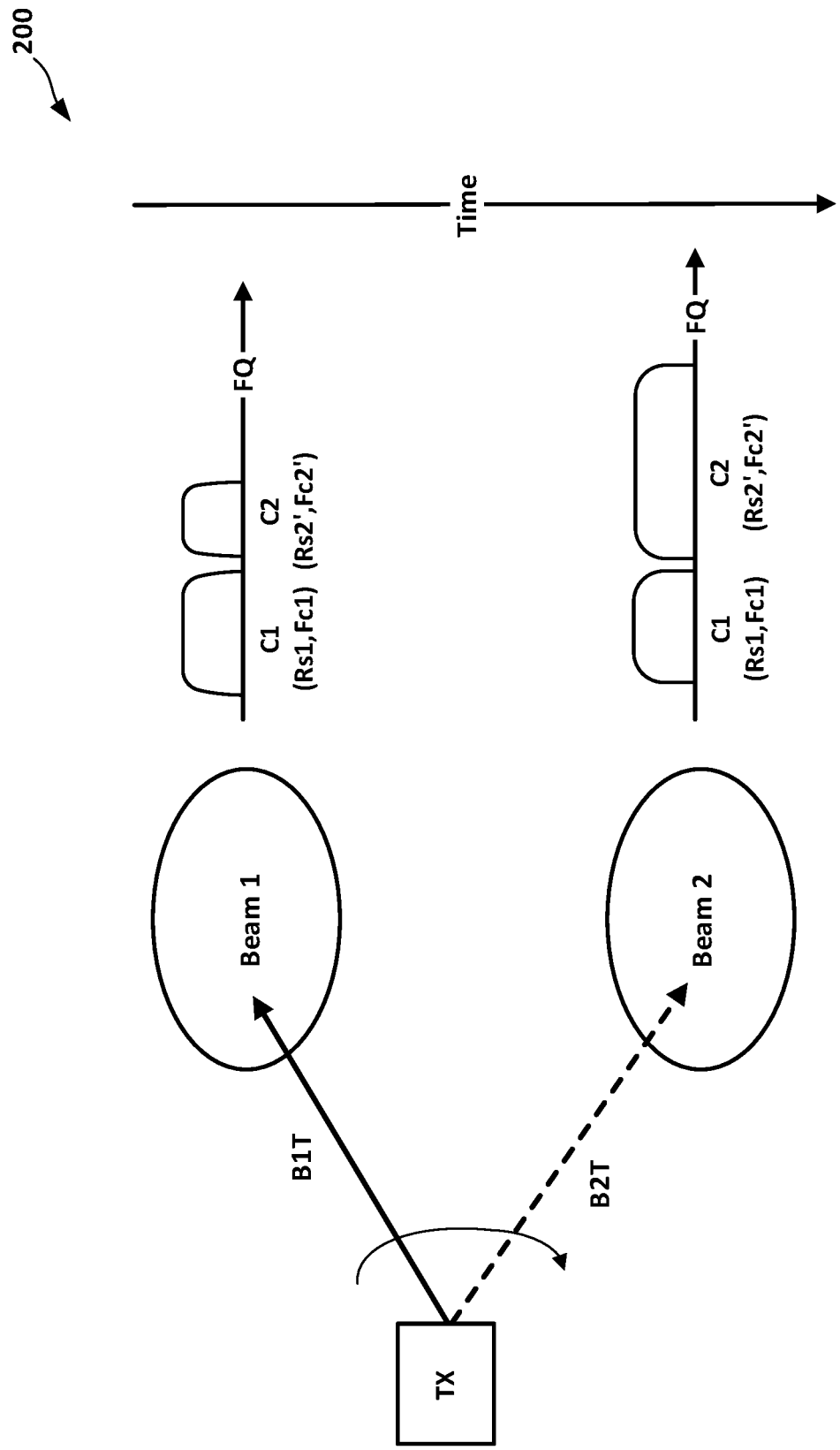
FIG. 2 is a graphical illustration of an example beam hopping system.

FIG. 2 is a graphical illustration of example beam hopping system 200, alternatively "system 200" that can include, for example, a forward beam hopping resource 202 configured to provide a specifically controlled, patterned movement of a single movable satellite beam, an outroute servicing a first cell (not separately labeled in FIG. 2) with a first spot beam 204A and an outroute servicing a second cell (not separately labeled in FIG. 2) with a second spot beam 204-2. The forward beam hopping resource 202 can be implemented, for example, with an adaptation of the FIG. 1 satellite gateway 102, connected via the FIG. 1 forward uplink 106 to the beam hopping satellite 108. An example adaptation to the FIG. 1 satellite gateway 102 can include a beam hop by beam hop reconfigurable multi-channel satellite gateway modem (not separately visible in FIG. 2). Example implementations and configurations thereof being in greater detail later in this disclosure. Features can include a hopping or commutating outroute or outroute segment, such as the example movable beam 206, and a logic (not separately visible in FIG. 2) that can steer the beam 206 to serve as a first beam 206-1 directed to place a first spotbeam 204-1 on a first cell (not separately labeled in FIG. 2) for a given duration, and then hop the beam 206 to serve as a second beam 206-2 placing the second spotbeam 204-2 on a second cell (not separately labeled in FIG. 2) for a given duration.

Features of the example beam hopping system 200 can include configuring a first group of upsamplers (not separately visible in FIG. 2) to feed the first beam 206-1 with a particular combination of channels, at a particular service quality, then reconfigure the upsamplers to be a second group that can feed the second beam 206-2 with another (or the same combination if desired) combination of channels, at another specification of service quality. Additional features, described in greater detail in later sections, can include fast reconfigurability of the upsamplers. One implementation can include a "ping pong" configuration. Features provided by the ping pong configuration can include, but are not limited to, capability of commencing initialization and reconfiguration of a set of upsamplers for a next hop while still serving a current hop.

As described in greater detail in later sections, benefits and features that can be provided by disclosed beam hopping SGM systems and methods, and by various modifications of same, can include but are not limited to, adaptability to different beam hopping schemes and techniques, and can further include dynamic, real time updating and adjustment, for example, to service types and service levels. Such features can provide, among other benefits, certain generic functioning and capabilities, as will be further understood and appreciated by persons of ordinary skill upon reading this disclosure. Accordingly, various implementations of systems and methods disclosed herein, and example configurations and features, will be alternatively referred to as "generic beam hopping" modems, or modem systems or methods, or as "generic beam hopping SGM" systems and methods, and various grammatical variations. It will be understood that in descriptions and portions of description herein that omit explicit recitation of specific language such as the examples identified above, the omission alone is not intended as, and is not to be understood as being indicative of or having a correlation to generic features.

Figure 3:
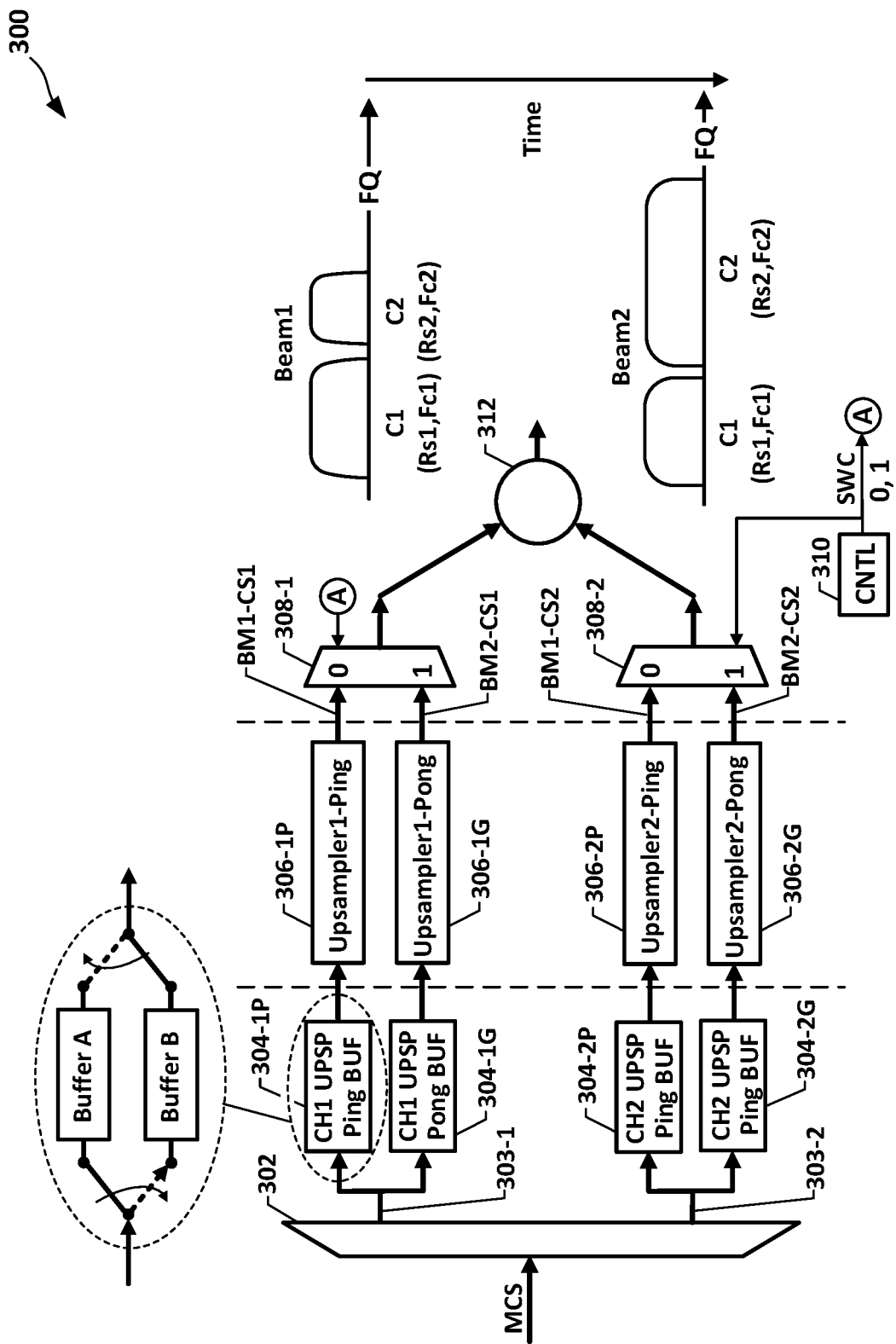
FIG. 3 is a block schematic of one example implementation of one beam hopping generic modem in accordance with this disclosure, along with portions of an example interfacing environment.

FIG. 3 is a block schematic of one example implementation of one beam hopping generic SGM system 300 in accordance with this disclosure, along with portions of an example interfacing environment. The beam hopping generic SGM system 300 is shown receiving a multi-channel sample stream, labeled "MCS." There can be various types and configurations of sources from which the MCS may be received, and selection may be specific to practices according to disclosed concepts. The MCS can be implemented through one or more virtual channels. An MCS source can be configured to carry, for example, a collection or aggregation of M sample streams (not separately visible in FIG. 3). One or more of such M sample streams can be third party content channels such as, for example and without limitation, multimedia entertainment. Protocols that can be used for multi-channel capabilities of MCS are not necessarily specific to practices in accordance with disclosed concepts. For example, the MCS can utilize time division multiple access (TDMA). One example TDMA implementation can configure MCS with integer P time slots. In such an implementation, the P time slots may be allocated, for example, using a per-channel allocation. The allocation can be fixed, event-driven, schedule driven, or any combination or subcombination thereof. TDMA is only an example. Alternative techniques can include, without limitation fixed or updatable assignment, or dynamically allocatable time-frequency slots.

As visible in FIG. 3, an implementation of the beam hopping generic SGM system 300 can include a 1:M channel splitter 302. The 1:M channel splitter 302 can be configured to separate the MCS stream into M logically separate channel sample streams. To avoid unnecessary obfuscation of concepts with a description of implementation details not specific to or illustrative of such concepts, the FIG. 3 system 300 uses an M value of two. Accordingly, the FIG. 3 1:M channel splitter 302 is a 1:2 logic splitter. Persons of ordinary skill in the pertinent arts, though, can readily adapt the FIG. 3 description to an implementation with M values other than two, e.g., four or more.

The FIG. 3 beam hopping generic SGM system 300 can include a first channel dual ping buffer 304-1P, which can be coupled to the CH1 output, labeled 303-1, of the 1:2 logic splitter 302. The first channel dual ping buffer 304-1P is configured to receive and parse the CH1 stream into successive CH1 sample blocks and feed the blocks to a ping first channel upsampler 306-1P. The system 300 can also include a first channel dual pong buffer 304-1G, also coupled to the CH1 output of the 1:2 logic splitter 302, and configured to parse the CH1 stream into successive CH1 sample blocks and feed the CH1 sample blocks to a pong first channel upsampler 306-1G. The FIG. 3 SGM system 300 can include a second channel dual ping buffer 304-2P and a second channel dual pong buffer 304-2G, and each can be coupled to the CH2 output, labeled 303-2, of the 1:2 logic splitter 302. The second channel dual ping buffer 304-2P can be configured to receive and parse the CH2 stream into successive CH2 sample blocks, and feed such blocks to a ping second channel upsampler 306-2P. The second channel dual pong buffer 304-2G can be configured to parse the CH2 stream into successive CH2 sample blocks, and feed the CH2 sample blocks to a pong second channel upsampler 306-2G.

It will be understood, reading this disclosure in its entirety, that the first beam upsampled first channel stream BM1-CS1 output from the ping first channel upsampler 306-1P can be delivered, by features and aspects of the system 300 that will be later described in greater detail, to the beam hopping satellite. In an aspect, delivery can be synchronized with the satellite's hopping pattern to be a feed for the first beam when dwelling on the first cell (not explicitly visible in FIG. 3). The second beam upsampled first channel stream BM2-CS1 output from the pong first channel upsampler 306-1G will also be later delivered to the beam hopping satellite, in a synchronization to the satellite's hopping pattern to be a feed for the second beam when dwelling on the second cell (not explicitly visible in FIG. 3) in the hopping pattern. The system 300 inclusion of both the ping first channel upsampler 306-1P and the pong first channel upsampler 306-1G enables both the first beam and the second beam to include an upsampled first channel stream. In an example application, a specified service to the first cell but not to the second cell can include the first channel, but the specified service for the second cell does not include the first channel, the first channel pong dual buffer 304-1G as well as the pong first channel upsampler 306-1G, or at least their respective operations, can be omitted.

The first beam upsampled second channel stream BM1-CS2 output from the ping second channel upsampler 306-2P can be delivered to the beam hopping satellite with a synchronization, examples of which are described in greater detail later to be another feed carried by the first beam (i.e., additional to the upsampled first channel stream CS-1 output from the ping first channel upsampler 306-1P when dwelling on the first cell (not explicitly visible in FIG. 3)). In like manner, the second beam upsampled second channel stream CS-2 output from the pang second channel upsampler 306-2G can be delivered to the beam hopping satellite in a synchronization with the second beam's dwell on the second cell (not explicitly visible in FIG. 3) in the hopping pattern.

The FIG. 3 implementation of the beam hopping generic SGM system 300 can include a 2:1 first channel upsampler selection switch 308-1 and a 2:1 second channel upsampler selection switch 308-2 (collectively referenced as "2:1 upsampling selector switches 308"). The 2:1 upsampling selector switches 308 can be controlled, e.g., via control line SWC by a system controller 310. An upsampled channel stream combiner 312 can be included, and can be configured to receive and combine or merge respective outputs of the 2:1 first channel upsampler selection switch 308-1 and 2:1 second channel upsampler selection switch 308-2, for feeding via uplink (not separately visible in FIG. 3) to the beam hopping satellite. Example features and operations of the 2:1 first channel upsampler selection switch 308-1, 2:1 second channel upsampler selection switch 308-2, and upsampled channel stream combiner 312, and their respective interactions with above-described features, will be later described in greater detail, referencing FIGS. 3, 4A, 4B, and 5.

The system 300 inclusion of both the ping second channel upsampler 306-2P and the pang second channel upsampler 306-2G enables both the first beam and the second beam to include an upsampled second channel stream. It will be understood that in an application or configuration in which the specified service to the first cell includes the second channel, but the specified service for the second cell does not include the second channel, the second channel pong dual buffer 304-2G as well as the pong second channel upsampler 306-2G, or at least their respective operations, can be omitted.

The CH1 first channel ping dual buffer 304-1P and the CH1 first channel pong dual buffer 304-1G may be configured to identically parse the CH1 sample stream or to parse the CH1 stream into respectively different configurations of sample blocks. Whether the CH1 ping and pong parsings are the same or different can depend, at least in part, on whether the ping first channel upsampler 306-1P and pong first channel upsampler 306-1G are identically configured or are differently configured. Likewise, the second channel ping dual buffer 304-2P and the second channel pong dual buffer 304-2G may be configured to identically parse the CH2 sample stream, or to respectively parse the CH2 stream into different configurations of sample blocks for the ping second channel upsampler 306-2P than for the pong second channel upsampler 306-2G. Whether the CH2 ping and pong parsings are the same or different can depend, at least in part, on whether the ping second channel upsampler 306-2P and pang second channel upsampler 306-2G are identically configured or are differently configured.

Figure 4A:
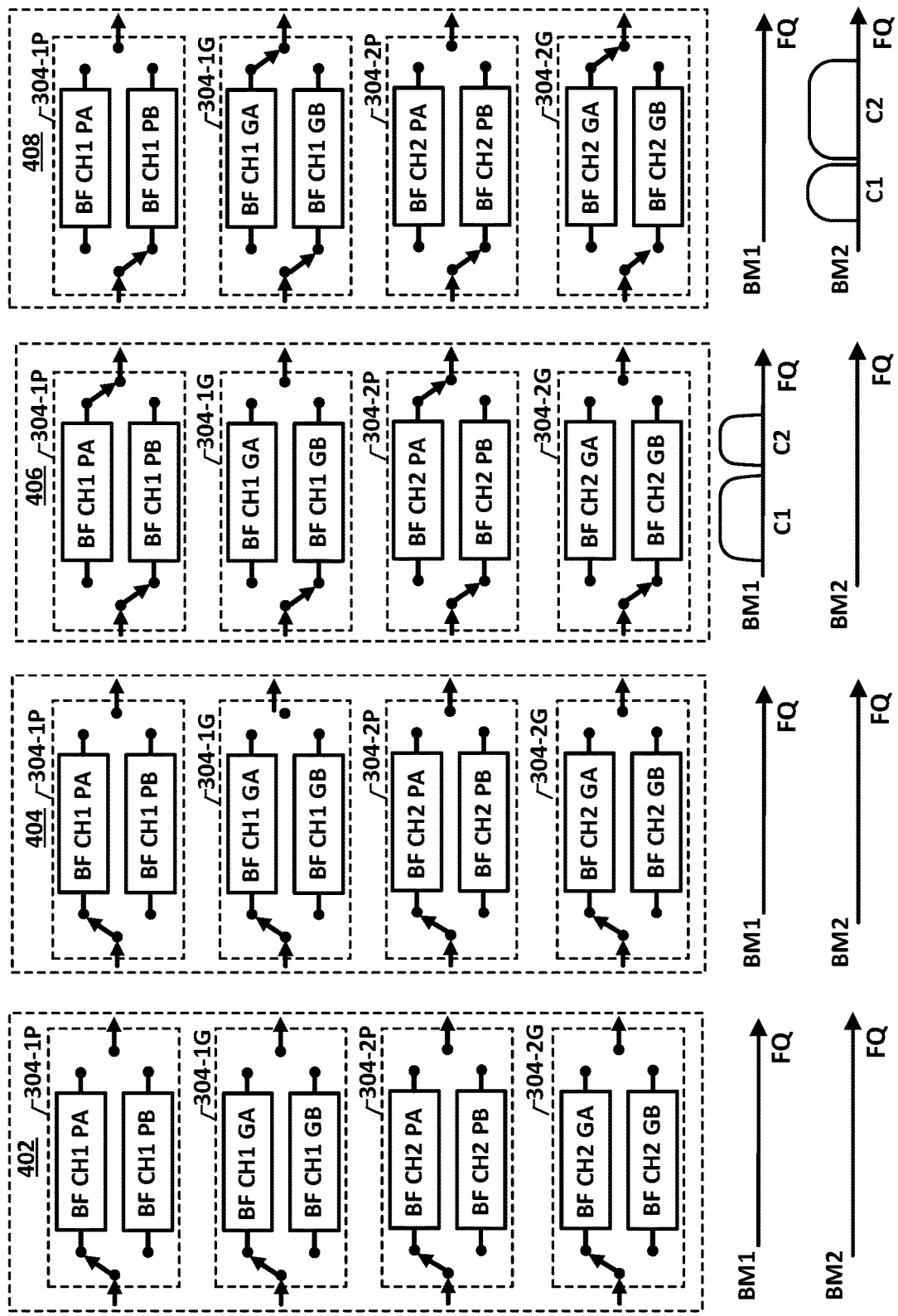
FIGS. 4A and 4B show an arbitrary sequence of arbitrary portions in a machine state sequence corresponding to a pre-switching upsample and buffer reconfiguration process in accordance with this disclosure, with reference to FIG. 3.
Figure 4B:
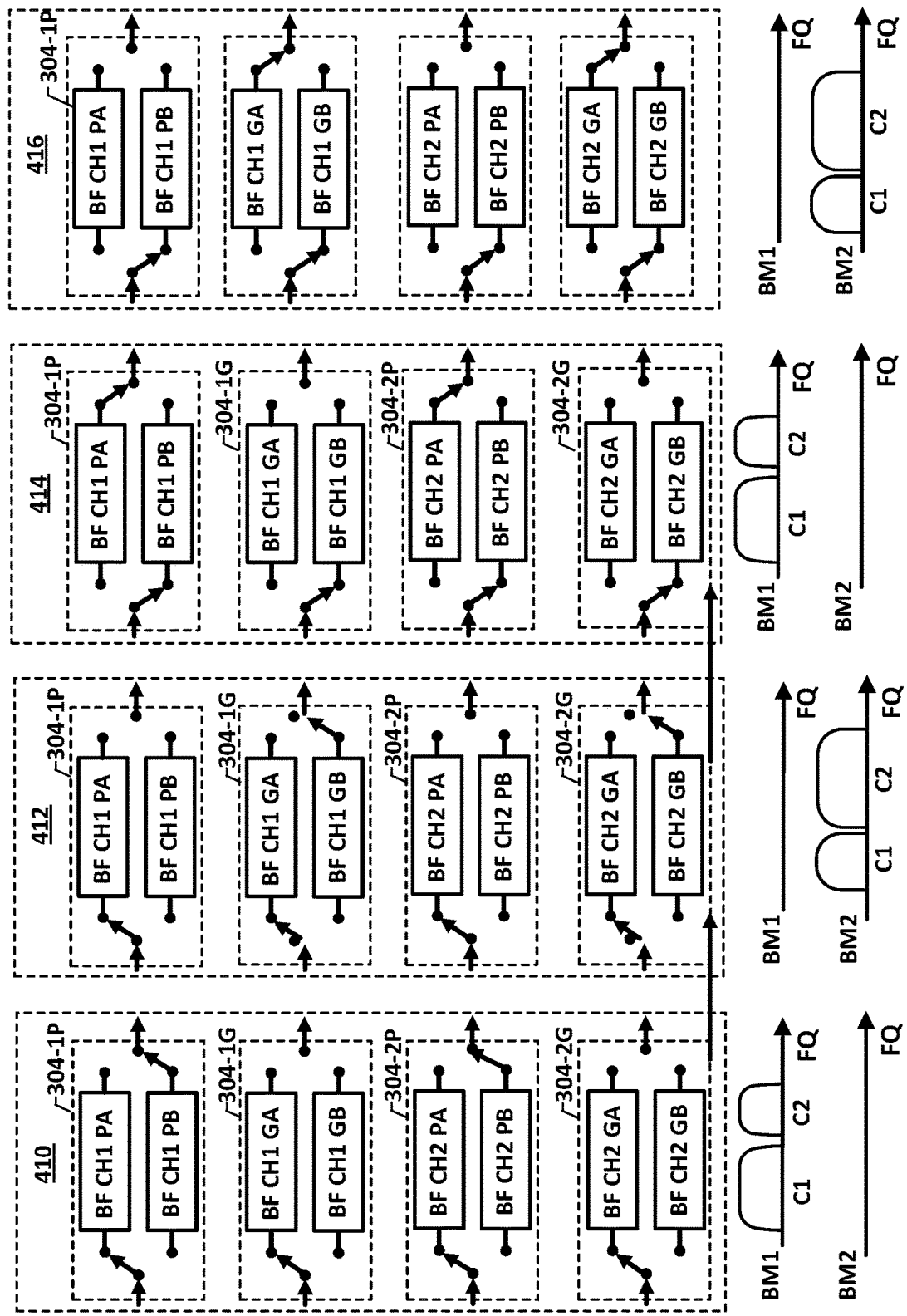

FIGS. 4A and 4B, briefly introduced above, show in a context of an example process of pre-switching reconfiguration of the first channel and second upsamplers in a two-beam hopping application, a first portion 400A and a second portion 4008 of a step-through state history of the FIG. 3 system 300. Each of the states is defined by the respective states of the first channel ping and pong dual buffers 304-1P and 304-1G, their corresponding ping first channel upsampler 306-1P and pong first channel upsampler 306-1G, together with the second channel ping and pong dual buffers 304-2P and 301-2G, and their corresponding ping second channel upsampler 306-2P and pang second channel upsampler 306-2G.

Figure 5:
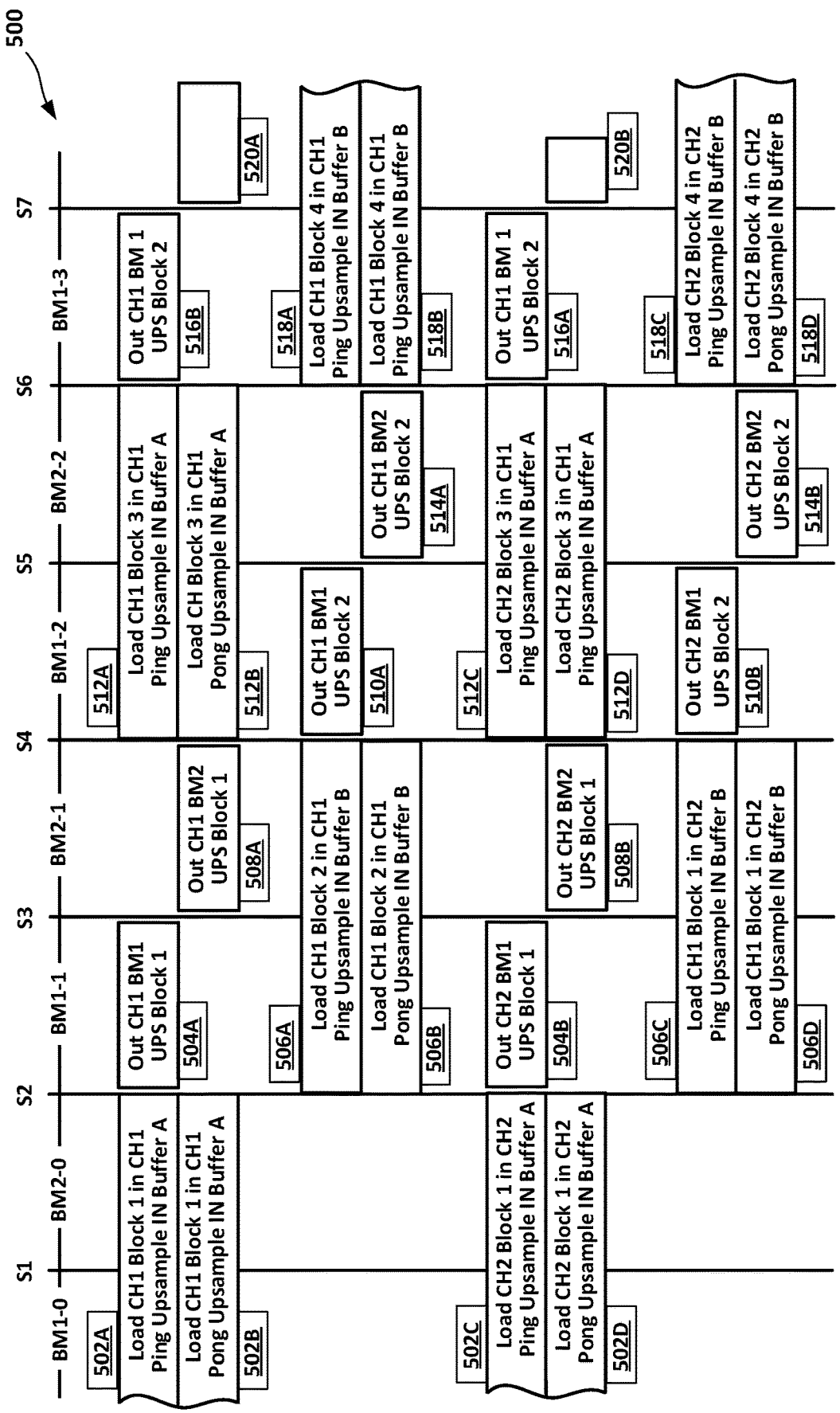
FIG. 5 is a sequence diagram representative of operations of loading channel samples into a configuration of ping and pong channel dual buffers.

FIG. 5 is a sequence diagram of operations in a process that can start with loading a block of upsampled first channel samples into the ping first channel dual buffers 304-1P and into the pang first channel dual buffers 304-1G, in addition to loading a block of upsampled second channel samples into the ping second channel dual buffers 304-2P and the pong second channel dual buffers 304-2G.

Example processes of a ping-pong sample block parsing, buffer loading, and upsampling sequence will now be described in greater detail, referencing FIGS. 3, 4A, 4B, and 5. It will be understood that FIGS. 4A and 4B show state history periods in terms of a two-beam hopping pattern. It is assumed that the burst rate of upsampled channels that are carried both by the first beam to the first cell and the second beam to the second cell are at least twice the sample rate carried by the MCS. It will also be assumed that in implementations where the upsampled stream includes error correcting code (not explicitly visible in FIGS. 3, 4A, 4B, or 5) that the sample rate of the upsample stream can be increased to cover the coding overhead.

Referring to FIG. 4A, it will be assumed that prior to entry into state 402, the content of the first channel ping and pong dual buffers 304-1P and 304-1G, and the content of the second channel ping and pong dual buffers 304-2P and 304-2G are cleared. It will also be assumed that memory resources of the ping first channel upsampler 306-1P, pong first channel upsampler 306-1G, ping second channel upsampler 306-2P, and pong second channel upsampler 306-2G, e.g., intermediate result registers (not separately visible in FIGS. 3, 4A, 4B, or 5), are cleared.

Referring to FIGS. 4A and 5, it will be assumed for purposes of description that the MCS protocol and the structure of the 1:2 logic splitter 302 can be such that first channel samples CH1 and second channel samples CH2 can be substantially concurrent. It will also be assumed that the time required to receive an entire first channel sample block and concurrently or approximately concurrently receive a second channel sample block from the 1:2 logic splitter 302 can be two hop periods of the satellite beam. It will also be assumed that state 402 aligns with FIG. 5 first beam first dwell or period BM1-0, and state 404 aligns with FIG. 5 second beam first dwell or period BM2-0. As can be seen from FIG. 4A, at state 402, the first channel ping dual buffer 304-1P and first channel pong dual buffer 304-1G can receive samples from the first channel output of the 1:2 logic splitter 302, and route the samples to the buffers' respective "Buffer A" resources. Likewise, the second channel ping dual buffer 304-2P and second channel pong dual buffer 304-2G can route samples received from the second channel output of the 1:2 logic splitter 302 to such buffers' respective "Buffer A" resources. As referenced above, the sample rates that dual buffers 304-1P, 304-1G, 304-2P, and 304-2G receive from the 1:2 logic splitter 302 can be such that two beam dwell periods may be required to receive a complete sample block. Therefore, the first state 402 may be maintained for one beam hop period and, irrespective of the satellite hopping the beam to become a second beam, which can dwell for a hop period on the second cell, the first state 402 can be maintained unchanged into, and through to the end of state 404. Referring to FIG. 5 sequence events 502A, 502B, 502C, and 502D, at the end of state 404, i.e., when at or near alignment with switch event S2, a first channel first sample block can be resident in each of dual buffers 304-1P, 04-1G, 304-2P, and 304-2G.

At or in near alignment with switch event S2, Buffer A resource of the first channel ping dual buffer 304-1P can begin shifting or loading into the first channel ping upsampler 306-1P the first channel first sample block that was input during FIG. 4A states 402 and 404. Also at or in near alignment with switch event S2, Buffer A resource of the second channel ping dual buffer 304-2P can begin shifting or loading into the second channel ping upsampler 306-2P the first channel first sample block that was input during an interval spanning FIG. 4A states 402 and 404.

Figure 6:
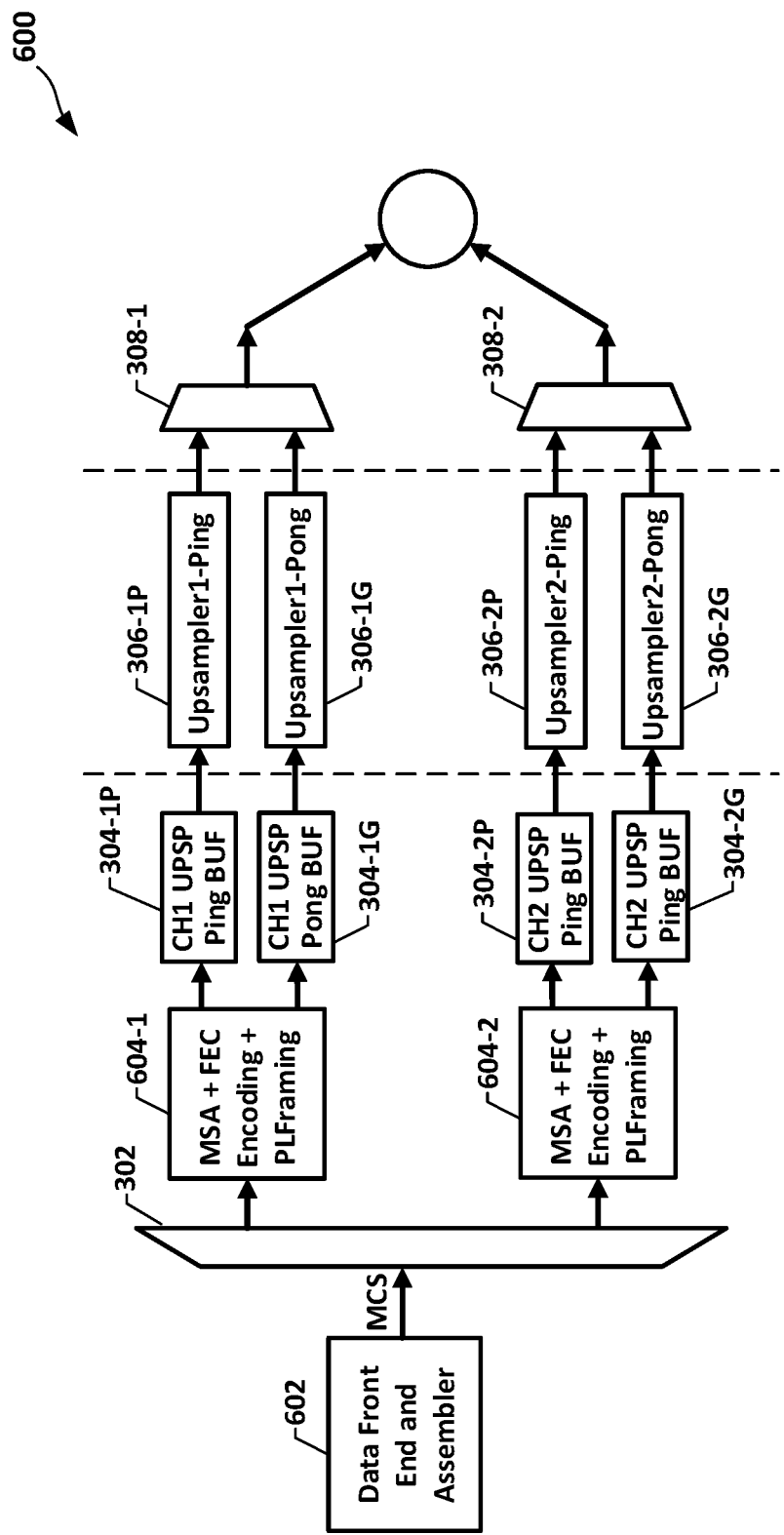
FIG. 6 is a functional block schematic of one adaptation of the FIG. 3 example beam hopping generic signaling gateway manager (SGM) system.

FIG. 6 is a block schematic of an adaptation 600 of the FIG. 3 beam hopping generic SGM system 300, (hereinafter, alternatively recited as "system 600" and as "beam hopping generic SGM system 600."). The FIG. 6 example of the system 600 shows two adaptations, namely, a data front end and assembler logic 602 that can source the MCS, and a first and a second error correcting code (FEC) and framing logic, respectively represented in the figure by blocks 604-1 and 604-2. The first and second FEC and framing logic blocks 604-1 and 604-2 (collectively "FEC and framing blocks 604") can be implemented, for example, by one or more known FEC and framing techniques, in configurations not necessarily specific to practices in accordance with disclosed concepts. Further detailed description is therefore omitted.

Figure 7:
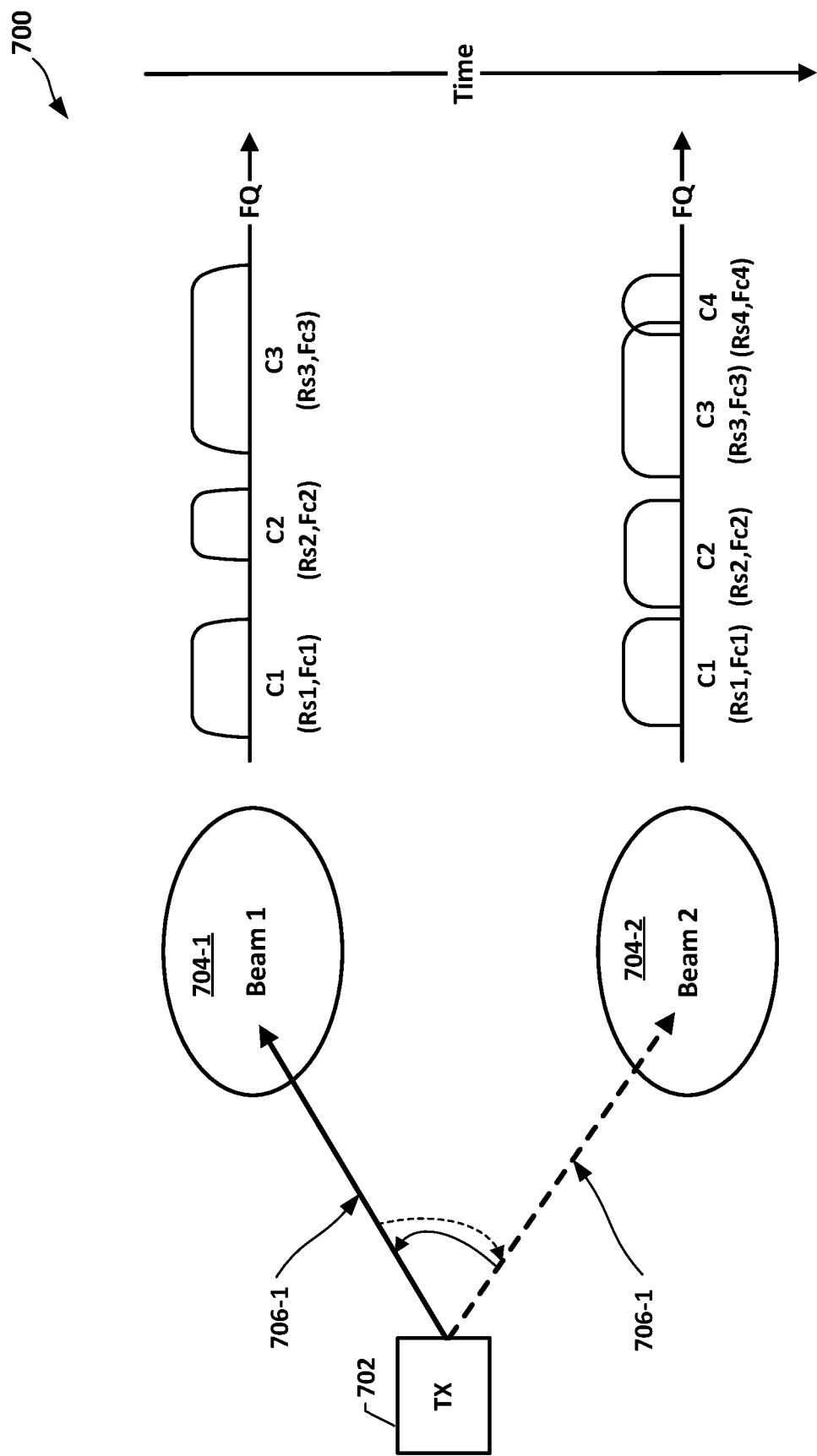
FIG. 7 is a functional block schematic of another example adaptation of the FIG. 2 beam hopping system.

FIG. 7 is a functional schematic of a system 700, which can be one example adaptation of the FIG. 2 beam hopping system 200. Features of the adaptation can include a differently configured (relative to FIG. 2) forward beam hopping resource 702, a first set or group of upsamplers (not visible in FIG. 7) that can deliver in a first beam 704-1 an example three streaming content channels, C1, C2, and C3, and a second set or group of upsamplers (not visible in FIG. 7) that can deliver in a second beam 704-2 the three contents channels delivered to the first cell and additionally deliver a fourth content channel C4.

Figure 8:
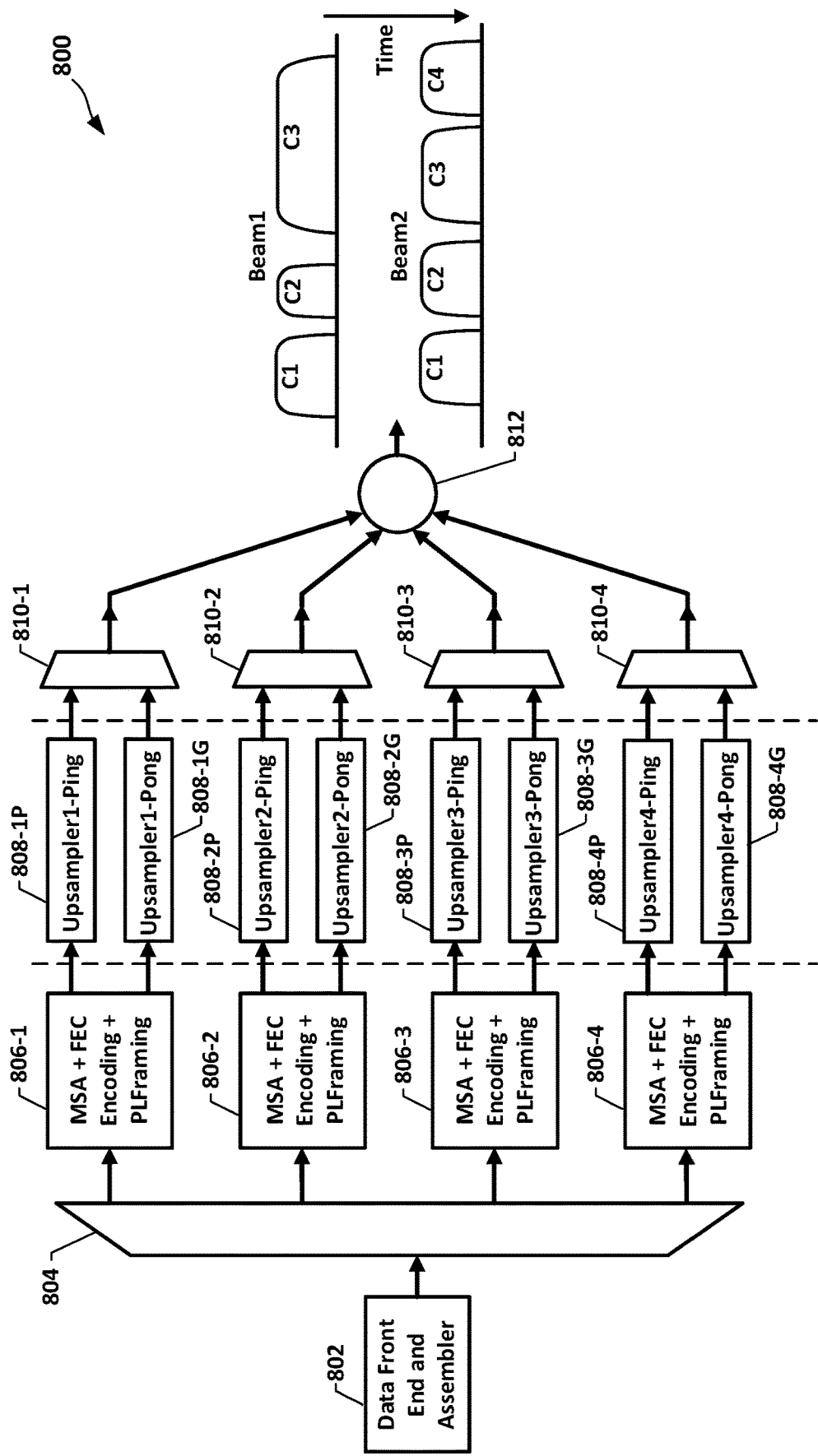
FIG. 8 is a functional block schematic of one example four-carrier ping-pong system, which can be one implementation of FIG. 7 system.

FIG. 8 is a functional block schematic of an example four-carrier ping-pong system 800, which can be one implementation of the FIG. 7 system 700. This figure includes a four-channel variation of the beam hopping generic SGM systems in FIG. 3 and FIG. 6. A 1:4 logic splitter 804 separates the content stream from a data front end and assembler 802 into four separate channel sample streams. An error correcting code (FEC) and framing logic, respectively represented by blocks 806-1, 806-2, 806-3, and 806-4, processes and sends each of the four separate channel sample streams to a corresponding ping channel upsampler and a pong channel upsampler for performing upsampling operations. Therefore, a ping first channel upsampler 808-1P outputs a first beam upsampled first channel stream and delivers it to the beam hopping satellite 108 of FIG. 1. In an aspect, delivery can be synchronized with the satellite's hopping pattern to be a feed for the first beam when dwelling on the first cell (not explicitly visible in FIG. 8). A pong first channel upsampler 808-1G outputs a second beam upsampled first channel stream and also delivers it to the beam hopping satellite, in a synchronization to the satellite's hopping pattern to be a feed for the second beam when dwelling on the second cell (not explicitly visible in FIG. 8) in the hopping pattern. The system 800 inclusion of both the ping first channel upsampler 808-1P and the pong first channel upsampler 808-1G enables both the first beam and the second beam to include an upsampled first channel stream.

In like manner, a ping second channel upsampler 808-2P and a pong second channel upsampler 808-2G in FIG. 8 enable both the first beam and the second beam to include an upsampled second channel stream, a ping third channel upsampler 808-3P and a pong third channel upsampler 808-3G enable both the first beam and the second beam to include an upsampled third channel stream, and a ping fourth channel upsampler 808-4P and a pong fourth channel upsampler 808-4G enable both the first beam and the second beam to include an upsampled fourth channel stream. As a result, each beam can support up to four channels for data transmission.

Figure 9:
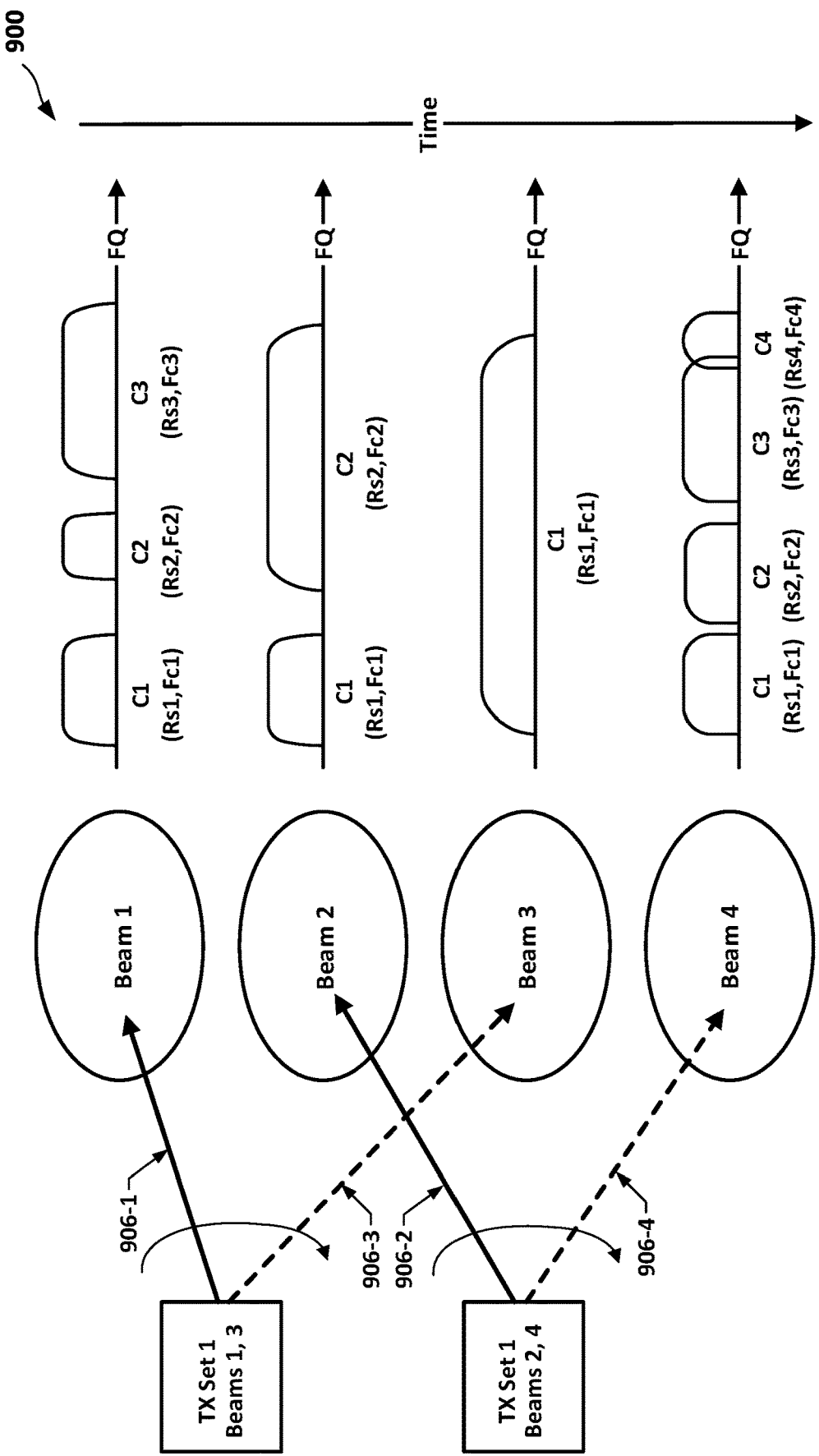
FIG. 9 is a graphical illustration of one example dual transmitter set, beam hopping satellite transmission system, with two multiple carrier beams, and a cell-dependent carrier and carrier channel bandwidth configuration.

FIG. 9 is a graphical illustration of one example dual transmitter set, beam hopping satellite transmission system 900, with two multiple carrier beams and one example cell-dependent carrier and carrier channel bandwidth configuration. Instead of using one forward beam hopping resource 202 of FIG. 2 to provide a single movable satellite beam, FIG. 9 includes two transmitters that provide two movable satellite beams. A first transmitter 902-1 can steer a moveable beam to serve as a first beam 906-1 directed to place a first spotbeam, e.g., beam 1, on a first cell (not separately labeled in FIG. 9) for a given duration, and a second transmitter 902-2 can steer another moveable beam to serve as a second beam 906-2 directed to place a second spotbeam, e.g., beam 2, on a second cell (not separately labeled in FIG. 9) for a given duration. The hopping or commutating outroute or outroute segment of the first transmitter 902-1 then hops the moveable beam to serve as a third beam 906-3 placing a third spotbeam, e.g., beam 3, on a third cell (not separately labeled in FIG. 9) for a given duration. Also, the hopping or commutating outroute or outroute segment of the second transmitter 902-2 hops the other moveable beam to serve as a fourth beam 906-4 placing a fourth spotbeam, e.g., beam 4, on a fourth cell (not separately labeled in FIG. 9) for a given duration. As compared to FIG. 8, the beam hopping satellite transmission system 900 creates up to four channels per beam responsive to hopping two moveable beams. Providing a two-beam hopping system may be beneficial in reducing the number re-configurations per beam (e.g., it may reduce the number to half the number of reconfigurations in a one-beam hoping system). Furthermore, the beam hopping rate may be reduced to one half of the beam hopping rate in a one-beam hoping system.

Figure 10:
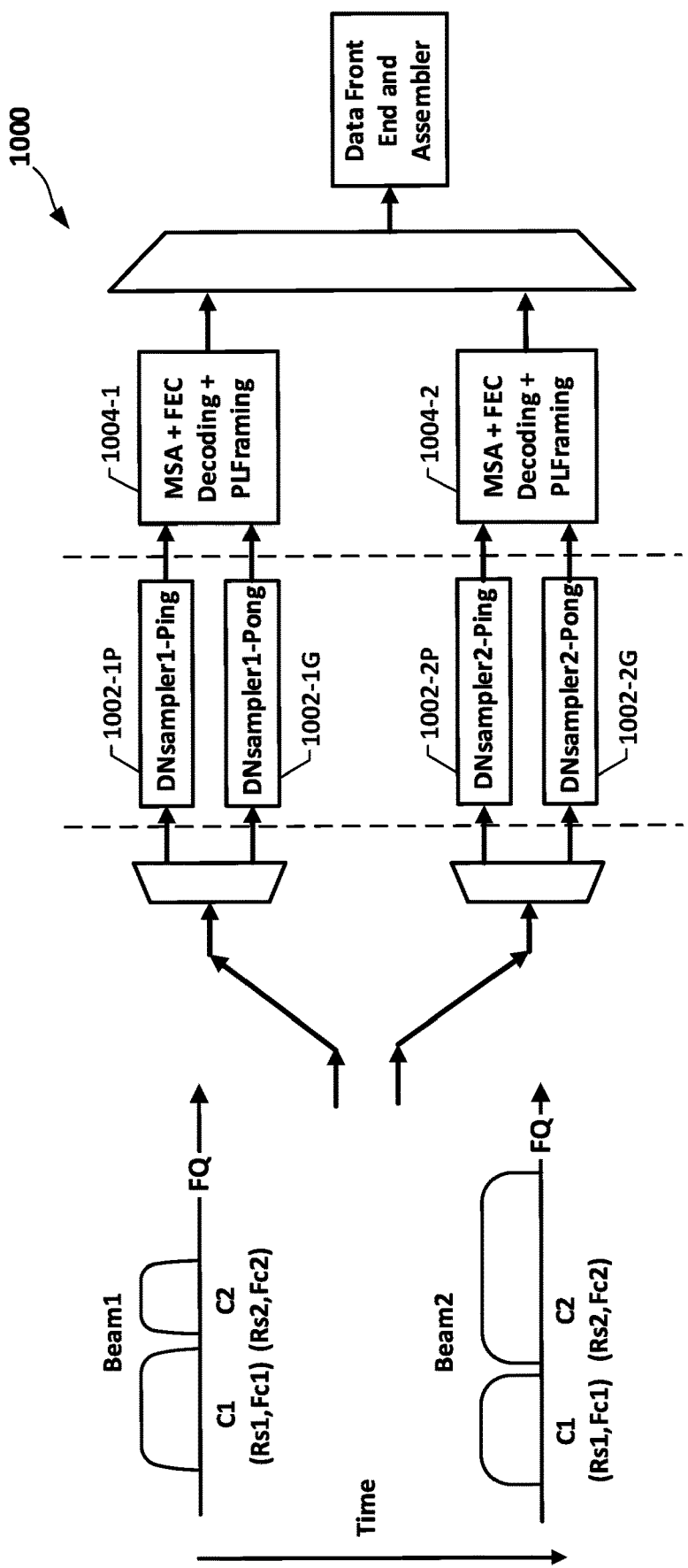
FIG. 10 is a functional block schematic of an example two-channel ping-pong receiver.

FIG. 10 is a functional block schematic of an example two-channel ping-pong receiver 1000 in accordance with this disclosure. As visible in FIG. 10, each of beam1 and beam2 includes an example two streaming content channels C1 and C2, which contain already-upsampled stream data and are received via a downlink from the beam hopping satellite 108 of FIG. 1 at a receiver of the satellite gateway 102 of FIG. 1. The upsampled first channel stream C1 is forwarded to a ping first channel downsampler 1002-1P and a pong first channel downsampler 1002-1G. The downsamplers 1002-1P and 1002-1G reduce the sampling rate of the stream data in the first channel C1 and feed the output stream to the MSA, FED decoding and PLFraming logic 1004-1 that is coupled to the downsamplers 1002-1P and 1002-1G for decoding, synchronizing, and the like. Likewise, the upsampled second channel stream C2 is input to a ping second channel downsampler 1002-2P and a pong second channel downsampler 1002-2G. The input second channel stream is downsampled by the downsamplers 1002-2P and 1002-2G and output to the MSA, FED decoding and PLFraming logic 1004-2 for decoding, synchronizing, and the like.

Figure 11:
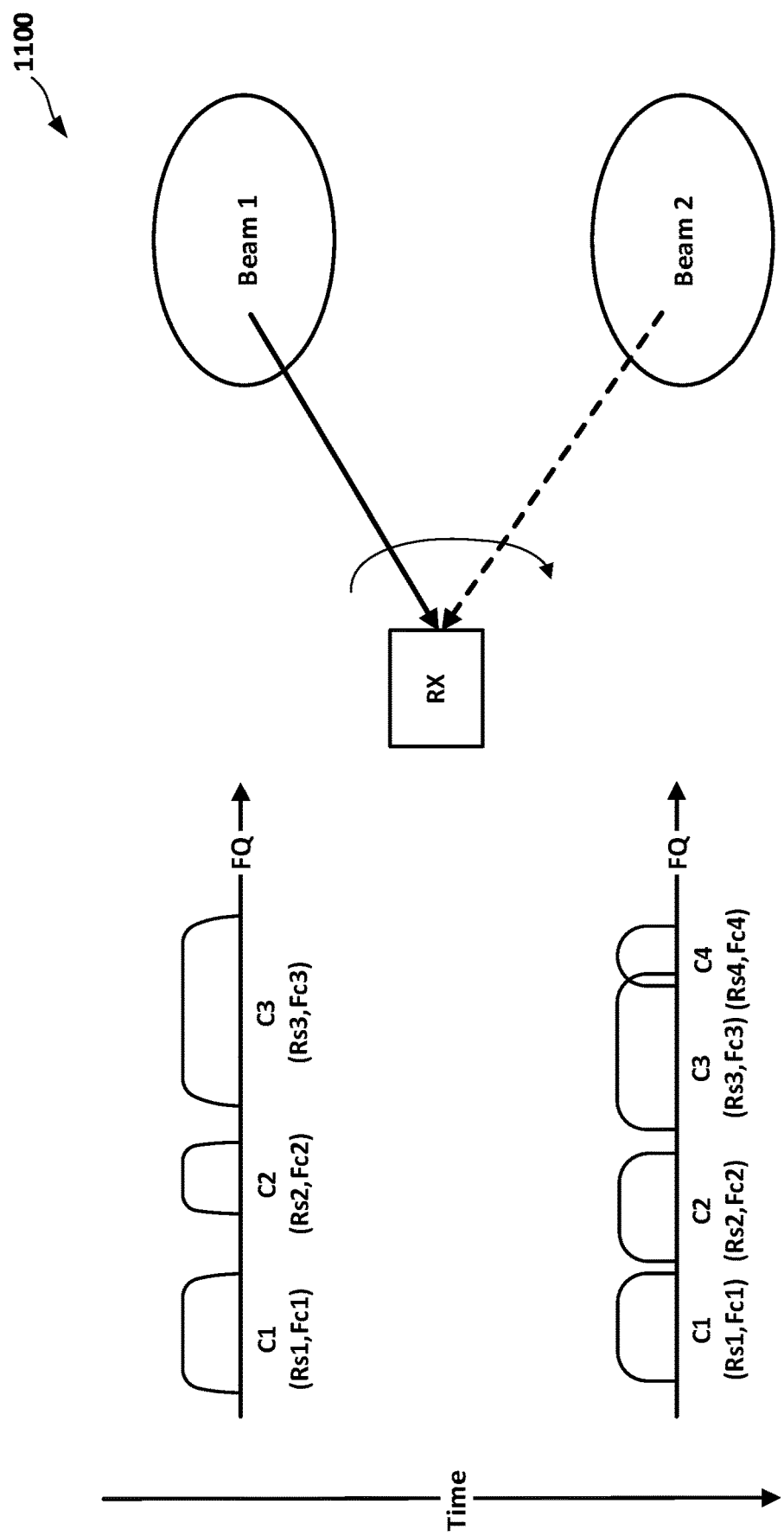
FIG. 11 is a functional block schematic of an example four-channel ping-pong receiver.

FIG. 11 is a functional block schematic of an example four-channel ping-pang receiver 1100 in accordance with this disclosure. In addition to interfacing an uplink from the GTW modem, the FIG. 1 beam hopping satellite 108 can transmit a downlink transmission beam, and hop the direction of the transmission beam through a sequence or pattern on a particular cell. The receiver of the FIG. 1 satellite gateway 102 can receive a first beam at a certain time. This first beam will illuminate the particular cell for a given dwell time, and then will be hopped to a different cell for illumination based on a beam hopping plan. Therefore, the receiver loses the first beam, and instead receives a second beam that is transited to the particular cell based on the beam hopping plan. In other words, the received beam at the receiver will change, when the satellite transitions to another beam in the beam hopping cycle.

It should be noted that frequency, timing and amplitude configurations necessary to receive the carriers from each beam can be dynamically reconfigured when receiving and demodulating carriers from different beams. Also, the receive beam hopping time plan can be distinct from the transmit time plan. The terminals can be programmed to provide, at every hopping instant, at least one of a specific symbol rate and center frequency information used for transmission of different beams.

Figure 12:
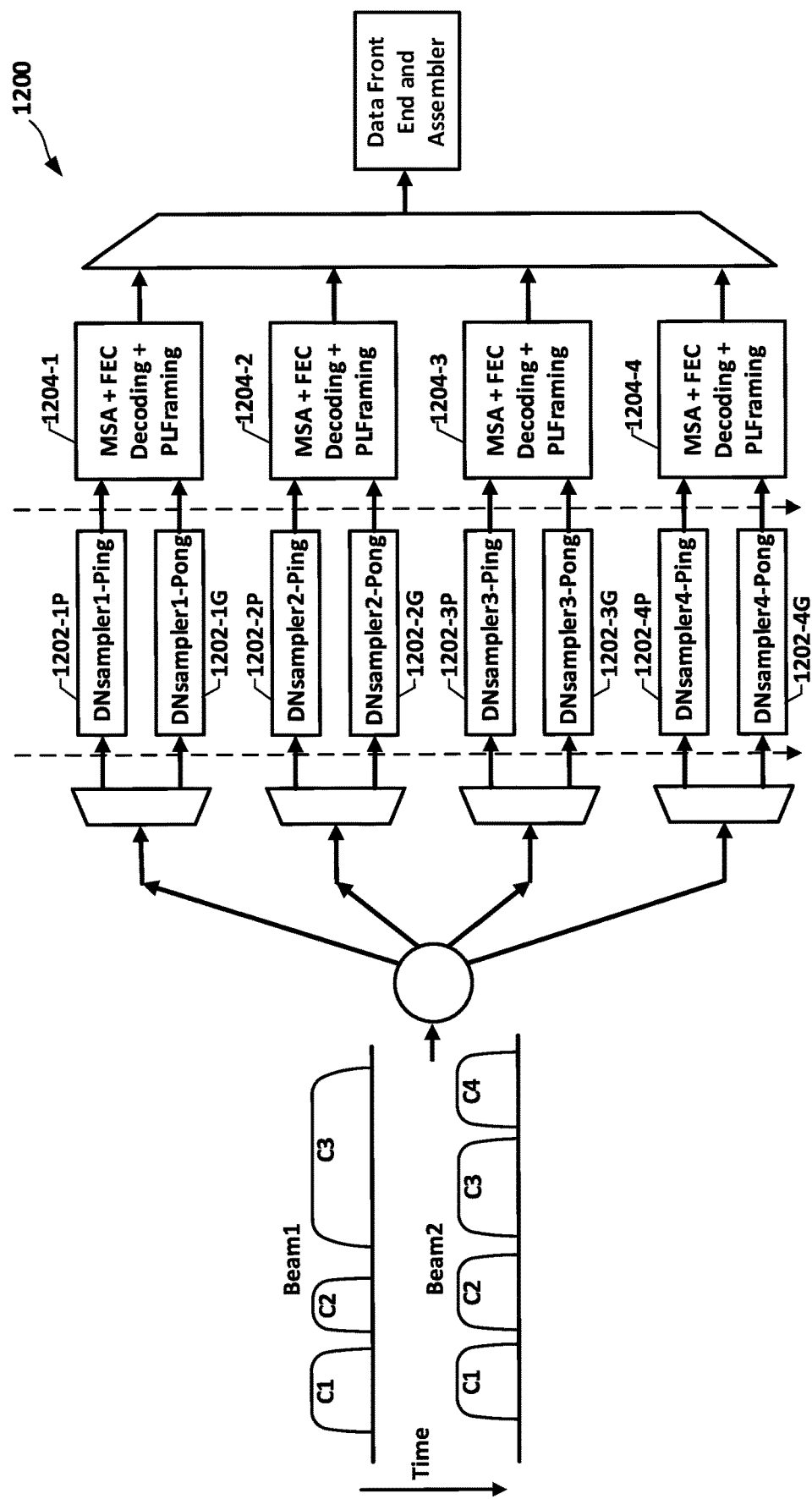
FIG. 12 is a functional block schematic of an example four-carrier ping-pong receiver.

FIG. 12 is a functional block schematic of an example four-carrier ping-pong receiver 1200 in accordance with this disclosure, which is an adaptation of the two-channel ping-pong receiver of FIG. 10. One adaptation is that each beam in FIG. 12 has up to four channels instead of two channels as depicted in FIG. 10. Another adaptation in FIG. 12 is that four sets of ping and pong downsamplers, respectively represented in the figure by blocks 1202-1P/1G through 1202-4P/4G, and MSA, FED decoding and PLFraming logic, respectively represented in the figure by blocks 1204-1 through 1204-4, are used to demodulate and synchronize the stream data contained in the channels of the beams for use by terminals accessed by end-users. Since these downsamplers and logic operate in a like manner as those in FIG. 10, further detailed description is omitted.

Figure 13:
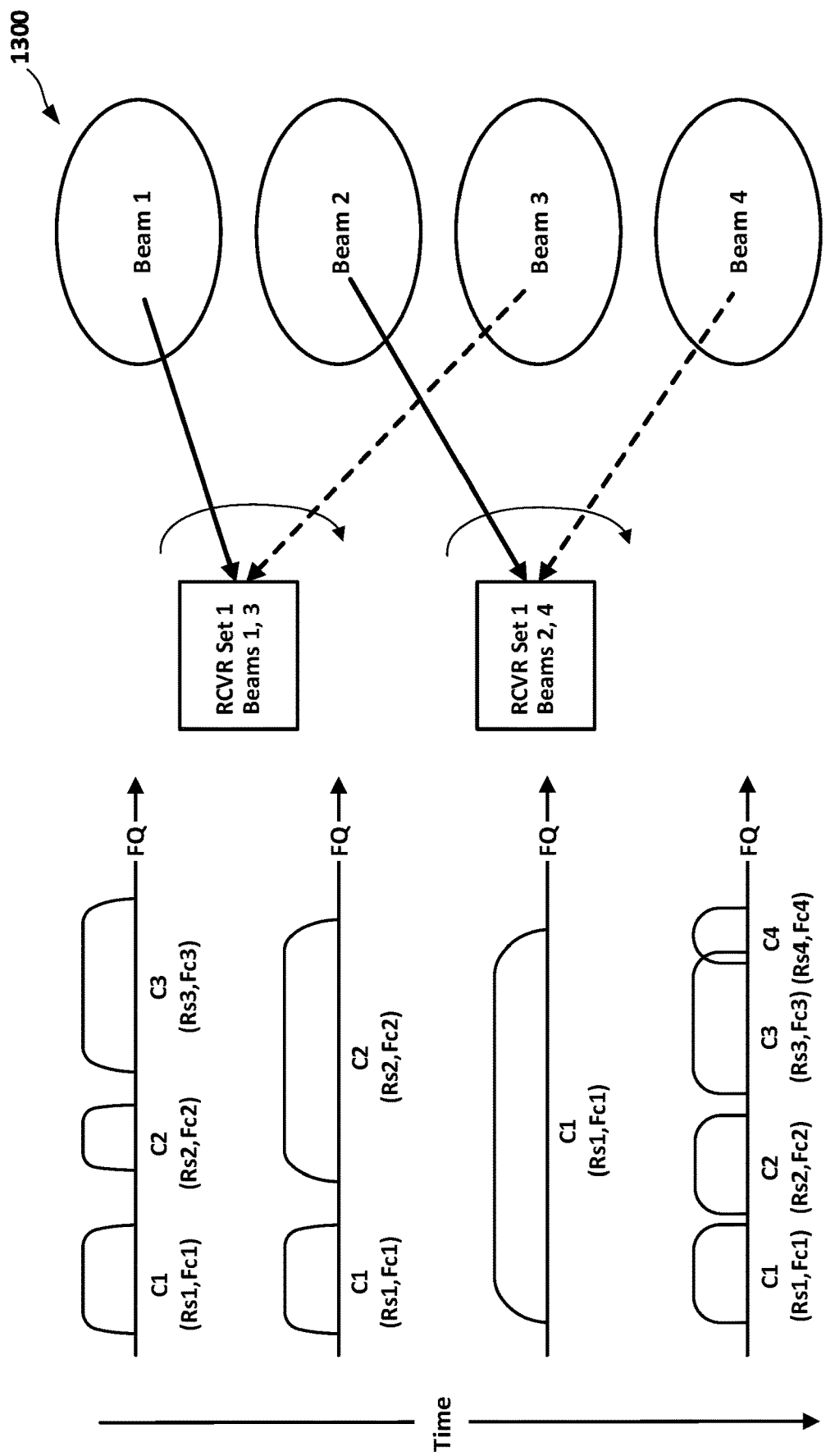
FIG. 13 is a graphical illustration of one example dual beam hopping receiver set, showing an example configuration of cell-dependent receive channels and receive channel bandwidths.

FIG. 13 is a graphical illustration of one example dual beam hopping receiver set 1300, showing an example configuration of cell-dependent receive channels and receive channel bandwidths. A receiver (e.g., at the satellite gateway 102) may receive bursts from terminals pertaining to one beam at a given instant. The received beam may be switched when the satellite transitions to another beam in the beam hopping cycle. In a MF-TDMA system, the carrier configuration, for example, on symbol rates and center frequencies, may be adjusted depending on the number of terminals and the achievable symbol rates for that user beam. The receiver when switching from one beam to the next will reconfigure the hardware architecture to the configuration of the next beam. In an implementation, a ping pong receiver architecture is used to shorten reconfiguration time.

In FIG. 13, four beams, each including up to four channels of content streams, are transmitted via downlinks from the beam hopping satellite 108 to one or more receivers, e.g., on the gateway 102 of FIG. 1. A first receiver set receives beam 1 at one instant. As time passes, the first receiver switches from beam 1 to beam 3 because the beam hopping satellite 108 transitions to beam 3. Although the switching of the received beams is based on the beam transition or hopping from the beam hopping satellite 108, the first receiver set can still reconfigure certain parameters such as symbol rates and center frequencies in order to adapt to the specific needs of a user beam. Similarly, a second receiver set may receive beam 2 at one time and beam 4 at a different time because of beam hopping but with a certain level of reconfiguration.

FIG. 14 is a functional block schematic of one implementation of a dual beam hopping transmitter set 1400, using partial-reprogramming architecture. A 1:4 logic splitter separates the content stream from a data front end and assembler into four separate channel sample streams. Each of these streams is processed by a corresponding error correcting code (FEC) and framing logic (1402-1, 1402-2, 1402-3, and 1402-4), and then forwarded to a corresponding upsampler (1404-1, 1404-2, 1404-3, and 1404-4) for performing upsampling operations. This structure allows optimized use of resources at the expense of non-continuous transmission. Furthermore, this architecture is useful when using super-frame format of Annex-E. The structure may use partial reconfiguration of FPGA elements affecting only the upsampler chain. Since there is only partial reconfiguration involved, the time to shift from one upsampler chain to a different upsampler is relatively short.

The partial reprogramming configuration allows reuse of existing resources (rather than twice through ping-pong configuration) and can therefore support more channels. For example, the partial reconfiguration allows for reuse of the ping-pong architecture in more than two beams. When one beam is being used, the other beam is being reconfigured. The partial reprogramming configuration therefore reduces throughput because it induces a null-time between beam hopping, e.g., the reconfiguration time of the other beam being reconfigured.

In practice, the partial reprogramming configuration may be implemented by loading a new set of elements, e.g., a number of upsamplers or waveform format modules, for each beam hop duration. For example, the partial reprogramming configuration may be implemented by partial loading of the FPGA that does not affect other elements of the FPGA and can be loaded in a short time.

Figure 15:
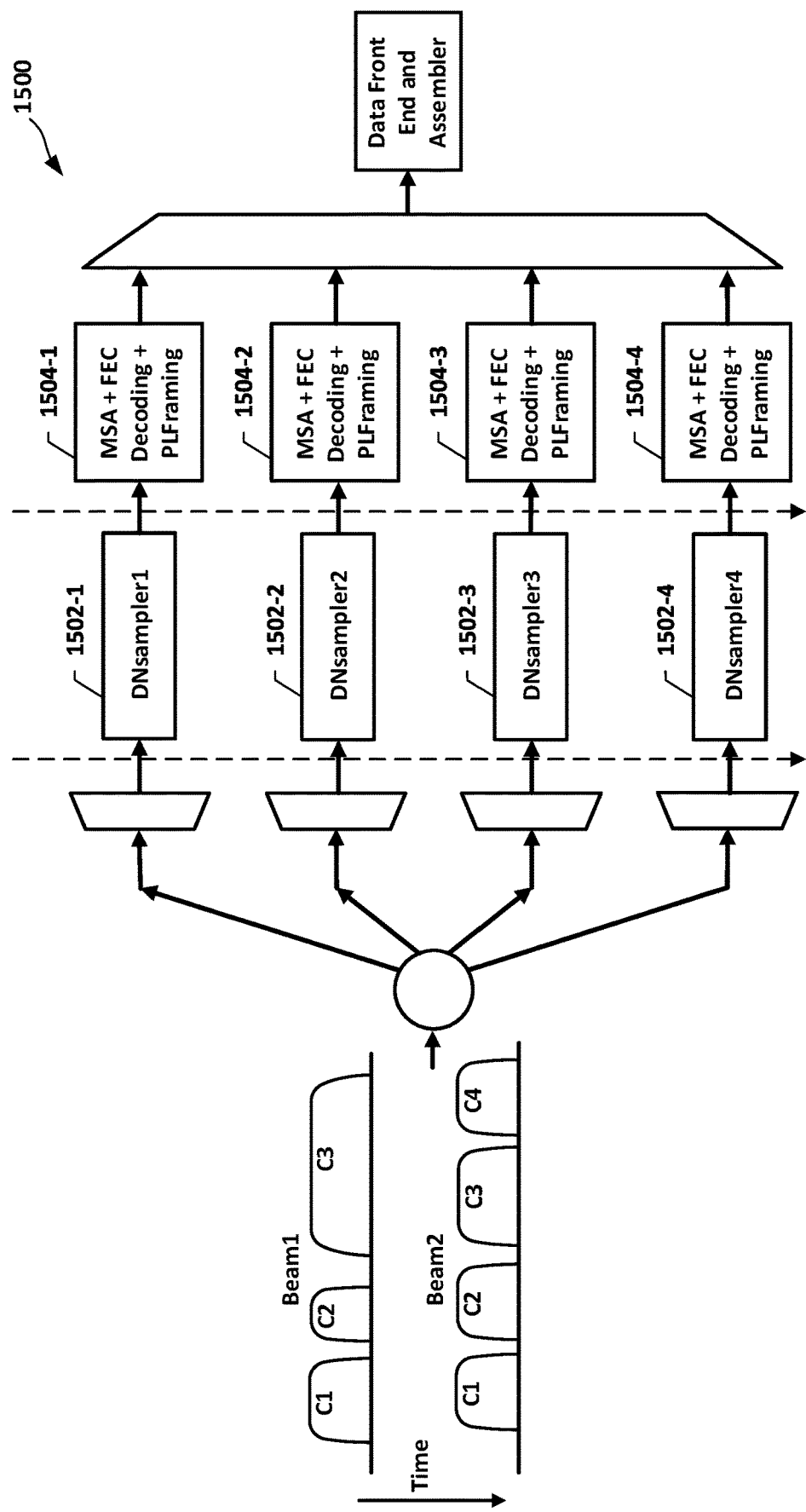
FIG. 15 is a functional block schematic of one implementation of an example dual beam hopping receiver set, configured to serve four cells, and provide examples of cell-specific receive channels and receive channel bandwidths.

FIG. 15 is a functional block schematic of one implementation of a dual beam hopping receiver set 1500, configured to serve four cells, each with cell-specific receive channels and receive channel bandwidths. As visible in FIG. 15, beam1 includes an example three streaming content channel, while beam2 includes an example four streaming content channel. Each channel contains already-upsampled stream data, which is delivered via a downlink from the FIG. 1 beam hopping satellite 108 at a receiver of the FIG. 1 satellite gateway 102. The upsampled first channel stream C1 is forwarded to a first downsampler 1502-1 and fed into MSA, FED decoding and PLFraming logic 1504-1 to demodulate and synchronize. Likewise, the upsampled second channel stream C2 is forwarded to a second downsampler 1502-2 and fed into MSA, FED decoding and PLFraming logic 1504-2 to demodulate and synchronize. The upsampled third channel stream C3 is forwarded to a third downsampler 1502-3 and fed into the MSA, FED decoding and PLFraming logic 1504-3 to demodulate and synchronize. Similarly, the upsampled fourth channel stream C4 is forwarded to a fourth downsampler 1502-4 and fed into the MSA, FED decoding and PLFraming logic 1504-4 to demodulate and synchronize.

Figure 16:
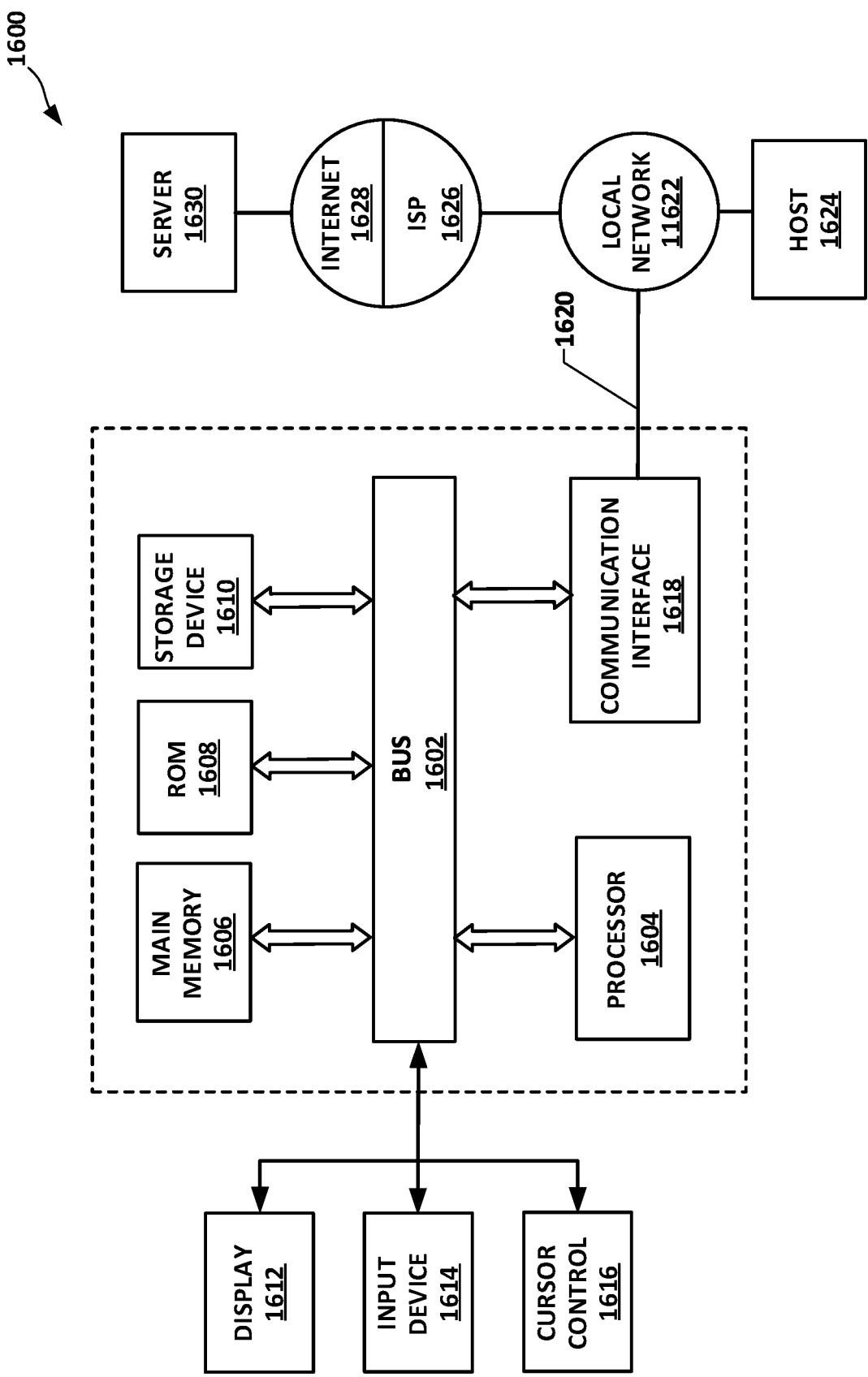
FIG. 16 is a functional block diagram of an example computer system upon which aspects of this disclosure may be implemented.

FIG. 16 is a functional block diagram of an example computer system 1600 upon which aspects of this disclosure may be implemented. It will be understood that logic blocks illustrated in FIG. 16 represent functions, and do not necessarily correspond to particular hardware on a one-to-one basis. The computer system 1600 can include a data processor 1604, coupled by a bus 1602 to an instruction memory or main memory 1606, a read-only memory 1608, and a storage device 1610. The instruction memory 1606 can include a tangible medium retrievably storing computer-readable instructions, that when executed by the data processor 1604 cause the processor to perform functions, processes, and operations described herein, for example, in reference to FIGS. 3, 4A, 4B, 5, 6, 8, 10, 12, and 15.

The computer system 1600 can also include a display 1612, a user interface or other input device 1614, and a cursor control 1616, either as separate devices or combined, for example, as a touchscreen display. The computer system 1600 can also include a communications interface 1618, configured to interface with a local network 1622 for accessing a local host server 1624, and to communicate through an ISP 1626 to the Internet 1628, and access a remote server 1630.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes a RAM, a PROM, and EPROM, a FLASH-EPROM any other memory chip or cartridge, a carrier wave as described hereinafter or any other medium from which a computer can read.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes sizes, and other specifications that are set forth in this specification, including in the claims that follow, are approximate. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracing of such subject matter is hereby disclaimed.

Except as expressly stated above, no statement herein is intended or should be interpreted to cause a dedication of any component, step, feature, object, benefit, advantage, or equivalent thereof to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, or apparatus comprising the element.

The Abstract of the Disclosure is provided to allow the reader to quickly identify aspects of the disclosed subject matter. In the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for satellite gateway feed for beam hopping, comprising:
    a processor; and
    a memory, coupled to the processor, configured to store processor executable instructions that, when executed by the processor, cause the processor to:
        receive an encoded data stream,
        generate a first upsampled encoded block, based at least in part on a first upsampling rate upsampling of a first content from the encoded data stream, communicate the first upsampled encoded block to a beam hopping satellite, on an uplink, during an uplink first time interval having a synchronization with a first beam of the beam hopping satellite, as a feed for the first beam,
        generate, starting at a time within the uplink first time interval, a second upsampled encoded block, based at least in part on a second upsampling rate upsampling of a second content from the encoded data stream, and
        communicate the second upsampled encoded block via the uplink to the beam hopping satellite, during an uplink second time interval having a synchronization with a second beam of the beam hopping satellite, as a feed for the second beam.

2. The system of claim 1, wherein:
    the first upsampling rate and the second upsampling rate differ by a rate difference,
    the first upsampling rate is configured to communicate the first upsampled encoded block via the uplink using a first bandwidth of the uplink during the uplink first time interval,
    the second upsampling rate is configured to communicate the second upsampled encoded block via the uplink using a second bandwidth of the uplink during the uplink second time interval, and the first bandwidth differs from the second bandwidth by a bandwidth difference that corresponds to the rate difference.

3. The system of claim 1, wherein:
the first upsampling rate upsampling of the first content from the encoded data stream includes loading at least a portion of the first content of the encoded data stream into a first buffer, as a content of the first buffer, feeding at least a portion of the content of the first buffer to a first upsampling rate upsampling process that is configured to generate, in response, at least a portion of the first upsampled encoded block,
the second upsampling rate upsampling of the second content from the encoded data stream includes loading at least a portion of the second content of the encoded data stream into a second buffer, as a content of the second buffer, feeding at least a portion of the content of the second buffer to a second upsampling rate upsampling process that is configured to generate, in response, at least a portion of the second upsampled encoded block.

4. The system of claim 3, wherein the first upsampling rate upsampling and the second upsampling rate upsampling are configured to receive and to upsample, as the respective first content and second content from the encoded data stream, an identical content from the encoded data stream.

5. The system of claim 1, wherein the processor executable instructions further include instruction that, when executed by the processor, cause the processor to:
switch a multiplexer switch between a first state and a second state, the multiplexer switch including a first input, a second input, and an output, the first input configured to receive the first upsampled encoded block, the second input configured to receive the second upsampled encoded block, and the output configured to communicatively couple to the uplink, wherein:
the first state is configured to couple the first input to the output, and the second state is configured to couple the second input to the output,
to communicate the first upsampled encoded block on the uplink includes switching the multiplexer switch to the first state,
to communicate the second upsampled encoded block on the uplink includes switching the multiplexer switch from the first state to the second state, and
to generate the second upsampled encoded block is configured to generate a portion of the second upsampled encoded block while the multiplexer switch is in the first state.

6. The system of claim 1, wherein:
the encoded data stream is a first channel encoded data stream, the first content from the encoded data stream is a first channel first content, the second content from the encoded data stream is a first channel second content, the first upsampling rate upsampling is a first channel first upsampling rate upsampling, the second upsampling rate upsampling is a first channel second upsampling rate upsampling, the first upsampled encoded block is a first channel first upsampled encoded block, the second upsampled encoded block is a first channel second upsampled encoded block, and the feed for the first beam is a first channel feed for the first beam; and
the executable instructions also include instructions that, when executed by the processor, cause the processor to:
receive a second channel encoded data stream,
generate an upsampled second channel encoded block based at least in part on a second channel upsampling rate upsampling of a content from the second channel encoded data stream, and
communicate the upsampled second channel encoded block, via the uplink, to the beam hopping satellite, during the uplink first time interval, as a second channel feed for the first beam.

7. The system of claim 6, wherein:
the feed for the second beam is a first channel feed for the second beam, the upsampled second channel encoded block is a first upsampled second channel encoded block, the second channel upsampling rate is a first second channel upsampling rate, and the content of the second channel encoded data stream is a first content of the second channel encoded data stream; and
the executable instructions also include instructions that, when executed by the processor, cause the processor to:
generate, starting at a time within the uplink first time interval, a second channel second upsampled encoded block, based at least in part on a second channel second upsampling rate upsampling of a second content from the second channel encoded data stream, and
communicate the second channel second upsampled encoded block, via the uplink, during the uplink second time interval, as a second channel feed for the second beam.

8. The system of claim 7, wherein:
the first channel first upsampling rate and the first channel second upsampling rate differ by a first channel rate difference,
the second channel first upsampling rate and the second channel second upsampling rate differ by a second channel rate difference,
the first channel first upsampling rate is configured to communicate the first channel first upsampled encoded block via the uplink using a first channel first bandwidth of the uplink during the uplink first time interval, and the first channel second upsampling rate is configured to communicate the first channel second upsampled encoded block via the uplink using a first channel second bandwidth of the uplink during the uplink second time interval,
the first channel first bandwidth differs from the first channel second bandwidth by a bandwidth amount that corresponds to the first channel rate difference, and
the second channel first bandwidth differs from the second channel second bandwidth by a bandwidth amount that corresponds to the first channel rate difference.

9. The system of claim 6, wherein the executable instructions also include instructions that, when executed by the processor, cause the processor to:
receive a multi-channel data stream, which includes a first channel data and a second channel data;
split the multi-channel data stream into a first channel stream carrying the first channel data and a second channel stream carrying the second channel data;
generate the first channel encoded data stream, based at least in part on a first channel encoding of the first channel stream; and
generate the second channel encoded data stream, based at least in part on a second channel encoding of the second channel stream.

10. The system of claim 7, wherein:
to generate the first channel first upsampled encoded block includes inputting a first content of the first channel encoded data stream as a content of a first channel first buffer, and unloading the content of the first channel first buffer to a first channel first upsample rate upsampling process, to generate the first channel second upsampled encoded block includes inputting a second content of the first channel encoded data stream as a content of a first channel second buffer, and unloading the content of the first channel second buffer to a first channel second upsample rate upsampling process, to generate the second channel first upsampled encoded block includes inputting a first content of the second channel encoded data stream as a content of a second channel first buffer, and unloading the content of the second channel first buffer to a second channel first upsample rate upsampling process, and to generate the second channel second upsampled encoded block includes inputting a second content of the second channel encoded data stream as a content of a second channel second buffer, and unloading the content of the second channel second buffer to a second channel second upsample rate process.

11. A method, comprising:

receiving an encoded data stream, generating a first upsampled encoded block, based at least in part on a first upsampling rate upsampling of a first content from the encoded data stream, communicating the first upsampled encoded block via an uplink to a beam hopping satellite, during an uplink first time interval having a synchronization with a first beam of the beam hopping satellite, as a feed for the first beam, generating, starting at a time within the uplink first time interval, a second upsampled encoded block, based at least in part on a second upsampling rate upsampling of a second content from the encoded data stream, and communicating the second upsampled encoded block via the uplink to the beam hopping satellite, during an uplink second time interval having a synchronization with a second beam of the beam hopping satellite, as a feed for the second beam.

12. The method of claim 11, wherein:

the first upsampling rate and the second upsampling rate differ by a rate difference, the first upsampling rate is configured such that communicating the first upsampled encoded block via the uplink uses a first bandwidth of the uplink during the uplink first time interval, the second upsampling rate is configured such that communicating the second upsampled encoded block via the uplink uses a second bandwidth of the uplink during the uplink second time interval, and the first bandwidth differs from the second bandwidth by a bandwidth difference that corresponds to the rate difference.

13. The method of claim 11, wherein:

the first upsampling rate upsampling of the first content from the encoded data stream includes:
 loading at least a portion of the first content of the encoded data stream into a first buffer, as a content of the first buffer,
 performing a first upsampling rate upsampling process on at least a portion of the content of the first buffer, and outputting as a result, a portion of the first upsampled encoded block, and the second upsampling rate upsampling of the second content from the encoded data stream includes:
 loading at least a portion of the second content of the encoded data stream into a second buffer, as a content of the second buffer,
 performing a second upsampling rate upsampling process on at least a portion of the content of the second buffer and outputting as a result, a portion of the second upsampled encoded block.

14. The method of claim 13, wherein the first upsampling rate upsampling process and the second upsampling rate upsampling process are configured to receive and to upsample, as the respective first content and second content from the encoded data stream, an identical content from the encoded data stream.

15. The method of claim 11, wherein the method further comprises:

switching a multiplexer switch between a first state and a second state, the multiplexer switch including a first input, a second input, and an output, the first input configured to receive the first upsampled encoded block, the second input configured to receive the second upsampled encoded block, and the output configured to communicatively couple to the uplink, wherein:

the first state is configured to couple the first input to the output, and the second state is configured to couple the second input to the output, communicating the first upsampled encoded block on the uplink includes switching the multiplexer switch to the first state, communicating the second upsampled encoded block on the uplink includes switching the multiplexer switch from the first state to the second state, and generating the second upsampled encoded block includes generating a portion of the second upsampled encoded block while the multiplexer switch is in the first state.

16. The method of claim 11, wherein:

the encoded data stream is a first channel encoded data stream, the first content from the encoded data stream is a first channel first content, the second content from the encoded data stream is a first channel second content, the first upsampling rate upsampling is a first channel first upsampling rate upsampling, the second upsampling rate upsampling is a first channel second upsampling rate upsampling, the first upsampled encoded block is a first channel first upsampled encoded block, the second upsampled encoded block is a first channel second upsampled encoded block, and the feed for the first beam is a first channel feed for the first beam, and the method further comprises:
 receiving a second channel encoded data stream,
 generating an upsampled second channel encoded block, based at least in part on a second channel upsampling rate upsampling of a content from the second channel encoded data stream, and
 communicating the upsampled second channel encoded block, via the uplink, to the beam hopping satellite, during the uplink first time interval, as a second channel feed for the first beam.

17. The method of claim 16, wherein:

the feed for the second beam is a first channel feed for the second beam, the upsampled second channel encoded block is a first upsampled second channel encoded block, the second channel upsampling rate is a first second channel upsampling rate, and the content of the second channel encoded data stream is a first content of the second channel encoded data stream, and the method further comprises:

generating, starting at a time within the uplink first time interval, a second channel second upsampled encoded block, based at least in part on a second channel second upsampling rate upsampling of a second content from the second channel encoded data stream, and communicating the second channel second upsampled encoded block, via the uplink, during the uplink second time interval, as a second channel feed for the second beam.

18. The method of claim 17, wherein:

the first channel first upsampling rate and the first channel second upsampling rate differ by a first channel rate difference, the second channel first upsampling rate and the second channel second upsampling rate differ by a second channel rate difference, the first channel first upsampling rate is configured to communicate the first channel first upsampled encoded block via the uplink using a first channel first bandwidth of the uplink during the uplink first time interval, and the first channel second upsampling rate is configured to communicate the first channel second upsampled encoded block via the uplink using a first channel second bandwidth of the uplink during the uplink second time interval, the first channel first bandwidth differs from the first channel second bandwidth by a bandwidth amount that corresponds to the first channel rate difference, and the second channel first bandwidth differs from the second channel second bandwidth by a bandwidth amount that corresponds to the first channel rate difference.

19. The method of claim 16, wherein the method further comprises:

receiving a multi-channel data stream, which includes a first channel data and a second channel data;

splitting the multi-channel data stream into a first channel stream carrying the first channel data and a second channel stream carrying the second channel data;

generating the first channel encoded data stream, based at least in part on a first channel encoding of the first channel stream; and generating the second channel encoded data stream, based at least in part on a second channel encoding of the second channel stream.

20. The method of claim 17, wherein:

generating the first channel first upsampled encoded block includes inputting a first content of the first channel encoded data stream as a content of a first channel first buffer, and unloading the content of the first channel first buffer to a first channel first upsample rate upsampling process, generating the first channel second upsampled encoded block includes inputting a second content of the first channel encoded data stream as a content of a first channel second buffer, and unloading the content of the first channel second buffer to a first channel second upsample rate upsampling process, generating the second channel first upsampled encoded block includes inputting a first content of the second channel encoded data stream as a content of a second channel first buffer, and unloading the content of the second channel first buffer to a second channel first upsample rate upsampling process, and generating the second channel second upsampled encoded block includes inputting a second content of the second channel encoded data stream as a content of a second channel second buffer, and unloading the content of the second channel second buffer to a second channel second upsample rate process.

\* \* \* \* \*